(12) United States Patent
Minagawa et al.

(10) Patent No.: US 8,908,073 B2
(45) Date of Patent: *Dec. 9, 2014

(54) SOLID-STATE IMAGING DEVICE AND CAMERA SYSTEM

(75) Inventors: Yusuke Minagawa, Kanagawa (JP); Go Asayama, Kanagawa (JP)

(73) Assignee: Sony Corporation (JP)

( * ) Notice: Subject to any disclaimer, the term of this patent is extended or adjusted under 35 U.S.C. 154(b) by 40 days.

This patent is subject to a terminal disclaimer.

(21) Appl. No.: 13/594,399

(22) Filed: Aug. 24, 2012

(65) Prior Publication Data

US 2013/0057744 A1    Mar. 7, 2013

(30) Foreign Application Priority Data

Sep. 2, 2011    (JP) .................................. 2011-192114

(51) Int. Cl.
*H04N 5/335*    (2011.01)
*H04N 5/3745*    (2011.01)
*H04N 9/04*    (2006.01)
*H04N 5/355*    (2011.01)

(52) U.S. Cl.
CPC ......... *H04N 5/35563* (2013.01); *H04N 5/3745* (2013.01); *H04N 9/045* (2013.01)
USPC .......................................... 348/302; 348/308

(58) Field of Classification Search
CPC ........ H04N 5/335; H04N 5/378; H04N 9/045
USPC ................. 348/294, 297, 300, 301, 302, 308, 348/230.1
See application file for complete search history.

(56) References Cited

U.S. PATENT DOCUMENTS

| | | | | |
|---|---|---|---|---|
| 7,245,322 | B2 * | 7/2007 | Oda et al. ...................... | 348/243 |
| 7,538,805 | B2 * | 5/2009 | Kubo ............................. | 348/251 |
| 7,663,680 | B2 * | 2/2010 | Hashimoto et al. ........... | 348/301 |
| 2009/0190021 | A1 * | 7/2009 | Nitta et al. .................... | 348/308 |
| 2010/0013969 | A1 * | 1/2010 | Ui .................................. | 348/294 |
| 2011/0176042 | A1 * | 7/2011 | Kato et al. .................... | 348/294 |
| 2011/0181747 | A1 * | 7/2011 | Kido et al. ................. | 348/222.1 |
| 2012/0147237 | A1 * | 6/2012 | Xu et al. ....................... | 348/301 |
| 2013/0057743 | A1 * | 3/2013 | Minagawa et al. ........... | 348/302 |

FOREIGN PATENT DOCUMENTS

| | | |
|---|---|---|
| JP | 03-117281 | 5/1991 |
| JP | 8-31988 | 3/1996 |
| JP | 09-205589 | 8/1997 |
| JP | 2004-320119 | 11/2004 |
| JP | 2005-278135 | 10/2005 |
| JP | 2010-028423 | 2/2010 |

* cited by examiner

*Primary Examiner* — John Villecco
*Assistant Examiner* — Zhenzhen Wu
(74) *Attorney, Agent, or Firm* — Sheridan Ross P.C.

(57) ABSTRACT

A solid-state imaging device includes: a pixel unit in which pixels are arranged in a matrix pattern; and a pixel signal read-out unit including an AD conversion unit performing analog-to-digital (AD) conversion of a pixel signal read out from the pixel unit, wherein each pixel included in the pixel unit includes division pixels divided into regions in which photosensitivity levels or electric charge accumulating amounts are different from one another, the pixel signal reading unit includes a normal read-out mode and a multiple read-out mode, and includes a function of changing a configuration of a frame in accordance with a change of the read-out mode, and wherein the AD conversion unit acquires a pixel signal of one pixel by adding the division pixel signals while performing AD conversion for the division pixel signals.

39 Claims, 28 Drawing Sheets

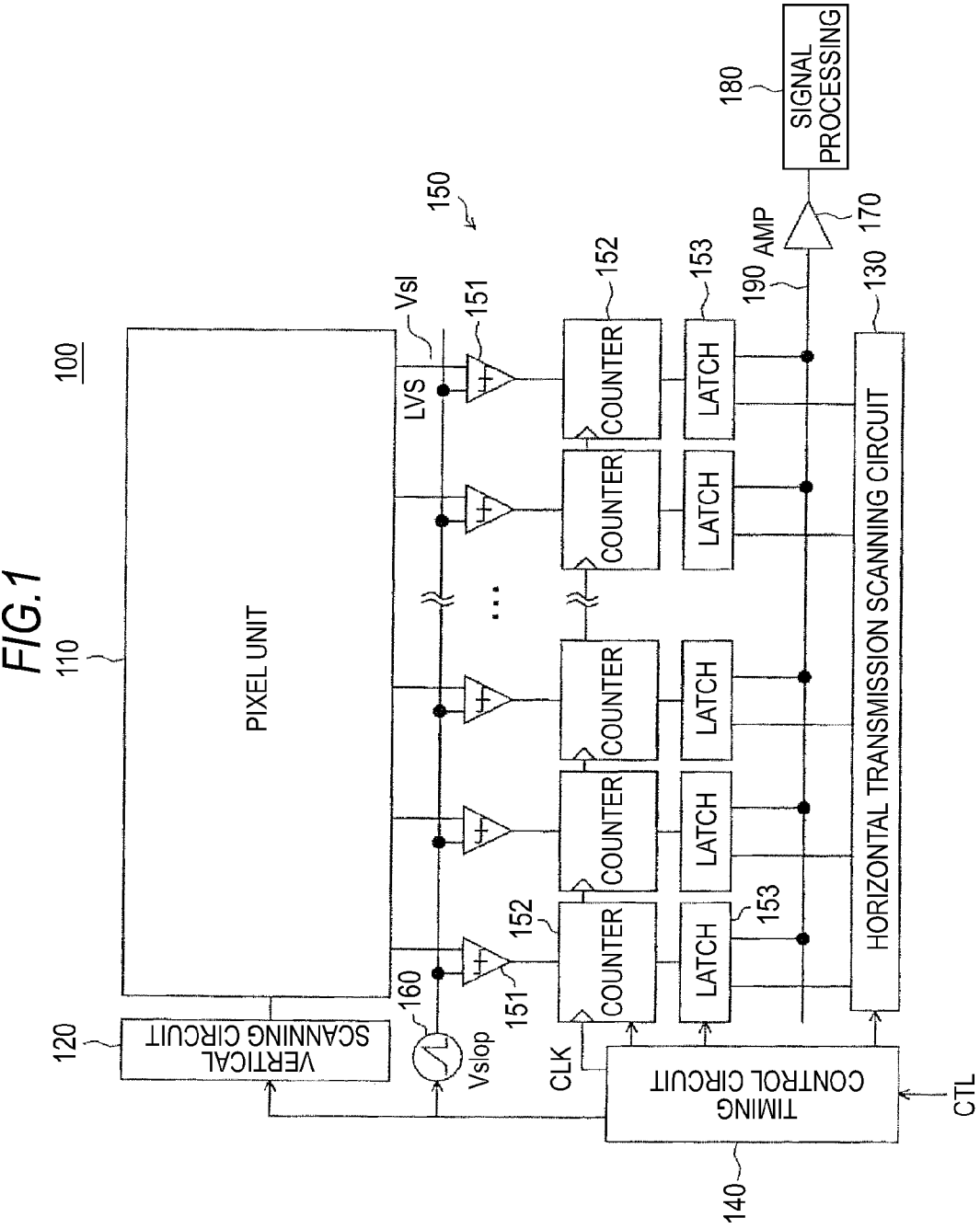

BAYER ARRAY

BAYER ARRAY

FULL-PIXEL READ-OUT

2 [ PIXELS ] READ-OUT IN SAME TIME (APPLIED IN WIDE D-RANGE MODE)

4 [ PIXELS ] READ-OUT IN SAME TIME (APPLIED IN FD-SUM MODE)

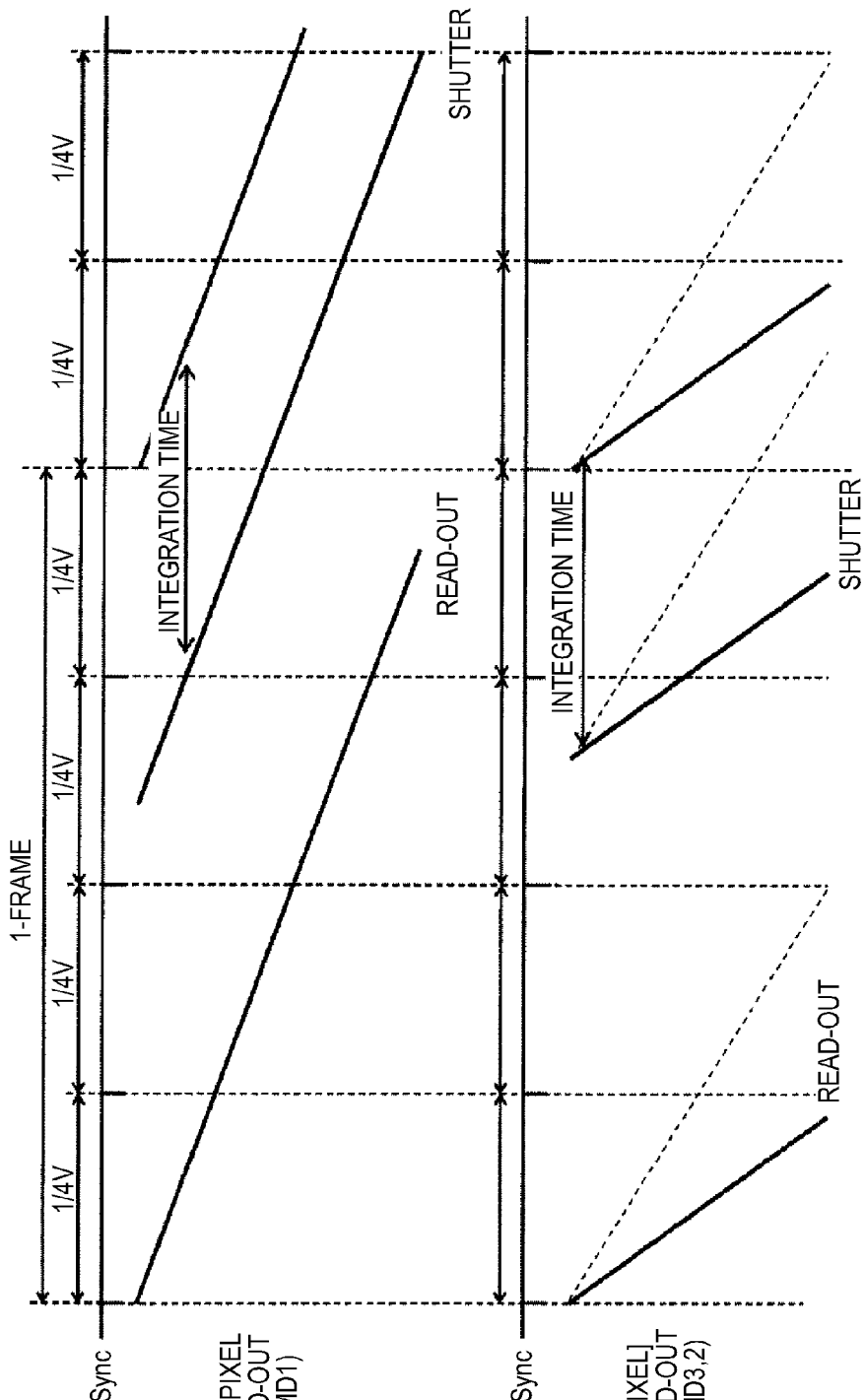

FIG.19

| MODE | AD/LINE | FRAME RATE |
|---|---|---|
| RMD1(FULL-PEL) | 2 | 1[ORIGINAL] |
| RMD2(WIDE DR) | 2 | ×2 |
| RMD3(FD SUM) | 1 | ×4 |

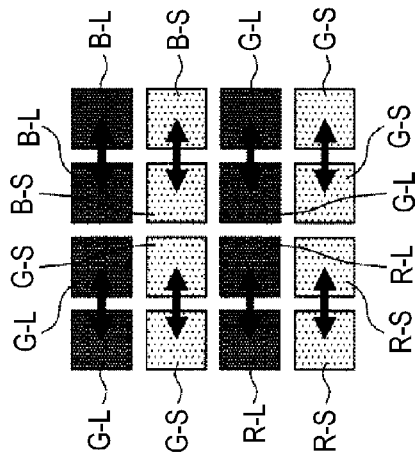
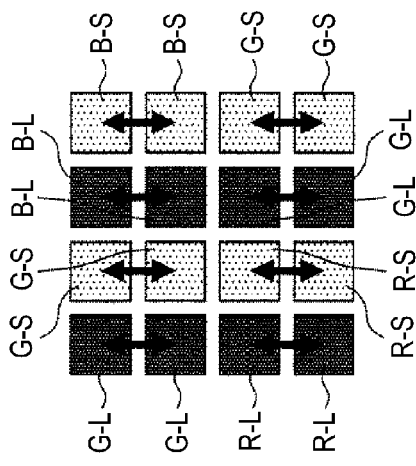
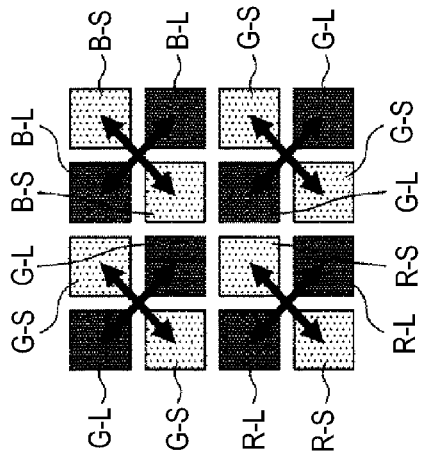

FIG.22A ADDITION IN DIAGONAL DIRECTION

FIG.22B ADDITION IN VERTICAL DIRECTION

FIG.22C ADDITION IN HORIZONTAL DIRECTION

※ONE PIXEL IS DIVIDED INTO FOUR, AND SENSITIVITY OR
ACCUMULATION TIME CHANGES FOR EACH DIVISION PIXEL

SQUARE FOUR
DIVISION (COMMON FD)

IVL
(DEAD SPACE)

SQUARE FOUR
DIVISION (INDIVIDUAL FD)

IVL
(DEAD SPACE)

RECTANGULAR FOUR
DIVISION (COMMON FD)

RECTANGULAR FOUR
DIVISION (INDIVIDUAL FD)

CONFIGURATION EXAMPLE OF COLUMN AD CONVERSION-TYPE CMOS IMAGE SENSOR CIRCUIT RELATING TO ADDITION OF DIVISION PIXELS

ANOTHER CONFIGURATION EXAMPLE OF COLUMN AD CONVERSION-TYPE CMOS IMAGE SENSOR CIRCUIT RELATING TO ADDITION OF DIVISION PIXELS

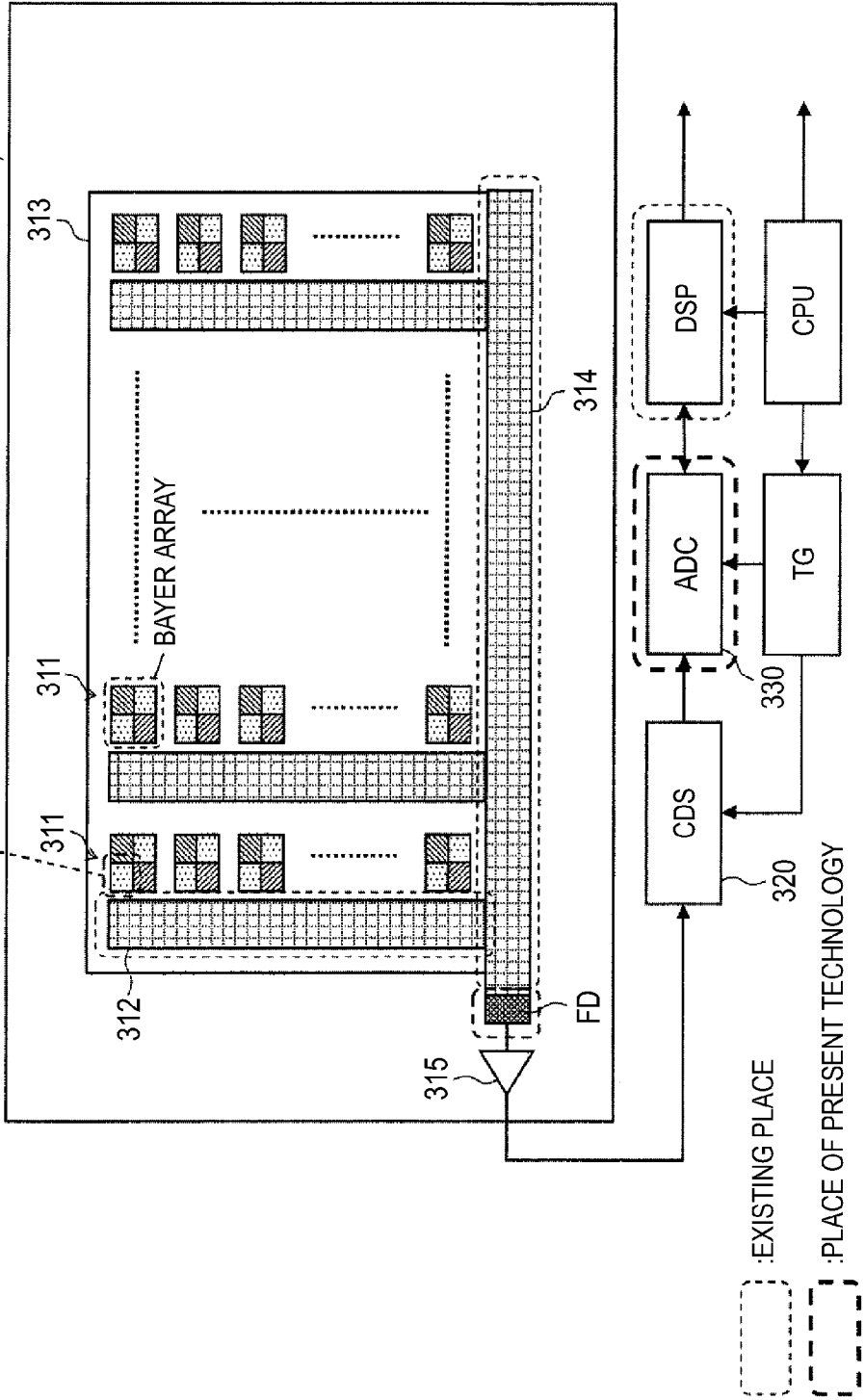

SOLID-STATE IMAGING DEVICE AND CAMERA SYSTEM

FIELD

The present technology relates to a solid-state imaging device that is represented by an image sensor such as a CCD or a CMOS image sensor and a camera system.

BACKGROUND

It is desired to realize a solid-state imaging device having a wide dynamic range in which high-luminance information is not flattened even in backlight imaging against a light source such as headlight of a vehicle, light illuminating a stadium, or sunlight, and a detailed part can be imaged without excessively darkening a low-luminance part of a subject image.

In such circumstances, techniques for enlarging the dynamic range of a solid-state imaging device such as a CCD are disclosed in Japanese Patent No. 2125710, JP-A-03-117281, JP-A-09-205589, JP-A-2004-320119, and the like.

In Japanese Patent No. 2125710, an example is represented in which a plurality (at least two) of areas (cells) having different sensitivity characteristics that correspond to a knee or more are disposed within one pixel such as a CCD, and the dynamic range of the CCD is increased by implementing so-called knee characteristics in which the input/output characteristics change in a stepped manner.

The knee characteristics refer to a characteristic curve in which a curve represented as the relation of an output current with respect to the exposure amount is lower in a high-input region than in a low-input region and are frequently referred to as a high-luminance signal compressing technique.

As methods of changing the sensitivity of a photosensitive area (cell), for example, a method in which the aperture ratio of the device is changed, a method in which an optical filter (ND filter) is disposed, a method in which the impurity density is changed, and the like are disclosed.

In Japanese Patent No. 2125710, although the technique is described to be applicable to an XY address-type imaging device other than the CCD, there is no detailed description.

In JP-A-03-117281, an example is disclosed in which, signal electric charges of cells disposed within one pixel are added so as to be set as the signal electric charge of the cell with pixels adjacent to each other or cells having mutually different photosensitive characteristics among photosensitive pixel cells of a CCD configured as one set, and a high dynamic range is acquired for which information does not collapse even under high light of a bulb or the like.

In such a case, as a unit that changes the photosensitivity, for example, cells having mutually different pixel areas are configured as a set.

In JP-A-09-205589, in the same way, one pixel of the photosensitive pixel cell of a CCD is divided into two areas having mutually different photosensitivity levels, and the signal electric charges of the areas in which the photosensitivity of the same pixel differs from each other are mixed and are vertically transmitted. Then, according to this technique, signal charges having mutually different photosensitivity levels are distributed to two horizontal transmission gates by a distribution gate, and a high-sensitivity side signal is clipped by an external signal processing circuit and then is added to a low-sensitivity side signal so as to form a video signal.

In such a case, the characteristic graph of the video signal output with respect to the intensity of incident light has the shape of a polygonal line, the gradient of the high sensitivity side (low illumination side) is sharp, and the gradient of the low sensitivity side (high illumination side) is gentle.

In JP-A-2004-320119, a method of solving a problem is disclosed in which, in an imaging device having a high-sensitivity cell and a low-sensitivity cell, the amount of data (raw data) of a raw image is large due to the data of both cells.

More specifically, it is automatically determined whether it is necessary to record image information of a high illumination unit by analyzing captured image information. In a case where "Yes" is determined, raw image data of the high illumination unit is recorded together with the information of a low illumination unit. On the other hand, in a case where "No" is determined, only the raw image data of the low illumination unit is recorded without recording the information of the high illumination unit.

A main photosensitive pixel cell (high sensitivity due to large area; a center portion of a micro-lens is mainly used) and a sub-photosensitive pixel cell (low sensitivity due to a small area; it is disposed on the edge side of the micro-lens) are combined so as to form one pixel.

In JP-A-2005-278135, a CMOS image sensor is disclosed in which a column-parallel ADC is configured by a comparator and an up/down counter. This CMOS image sensor can perform an addition calculation of pixel digital values over a plurality of rows without adding additional circuits such as an adder and a line memory device.

However, in the case of the above-described addition of division pixels, compared to a pixel having an area corresponding to a total area of target pixels, an ineffective area (dead space) that does not directly contribute to exposure is generated due to signal processing in a case where the pixel is divided.

Accordingly, since the area of an individual divided cell is smaller than that of a case where the cell is simply divided into four division cells, the number of saturated electrons is smaller than that of the former case, and accordingly, a shot noise relatively increases, whereby the S/N of the individual division pixel is degraded.

Whenever addition is performed, the shot noise is also added, and accordingly, the S/N of the result of the addition of division cells is also degraded.

In addition, the addition process of pixel signals is addition of analog signals, and the sensitivity differs for each pixel, and accordingly, there are problems that the saturated value is uneven, the break point position varies, and the like.

Furthermore, in the case of digital addition, it is necessary to provide a memory outside the sensor.

In other words, in an existing addition method in which one pixel cell is divided into two or more pixel cells of which the sensitivity levels or accumulation times are different from each other, and the photosensitivity is measured as the amount Qs of saturated electric charge, there are variations in the amount Qs of saturated electric charge for each pixel. Accordingly, for the same light intensity, the addition result varies for each pixel.

In other words, in a sensitivity graph (polygonal graph) in which the intensity of incident light is set as the horizontal axis, and the amount Qs of saturated electric charge is set as the vertical axis, at a divided pixel cell adding point (horizontal axis), the break point position (vertical axis) varies.

Thus, in JP-A-2010-28423, a method of realizing a wide dynamic range by changing the accumulation times of four pixels by applying a technique for regarding four pixels as one pixel is proposed. In this technique, four signals are added together.

According to this technique, the addition of division pixels in which there is no variation in the numbers of output electrons of pixels with respect to the intensity of incident light can be realized, the sensitivity is increased when the intensity of incident light is low, and the sensitivity is decreased when the intensity of incident light is high, whereby a wide dynamic range for which it is difficult for the output to be saturated can be acquired.

SUMMARY

However, the technique disclosed in JP-A-2010-28423 has the following disadvantages.

For example, in a case where a rotating body such as a propeller rotating at high speed is imaged, or a scene is imaged from a window of a moving electric train, an image in which many wings of the propeller are included or an image in which the scene looks distorted is formed.

In order to avoid such a situation, high-speed shutter imaging (multiple speed imaging) may be considered in which imaging is performed with a high shutter speed.

In a case where the multiple-speed imaging is performed, although the number of pixels that are simultaneously read out increases for a constant read-out clock signal, in such a case, the frame rate increases in correspondence with the number of pixels.

However, in a case where read-out is performed with such a frame rate, the activation ratio of the circuit increases, whereby there is concern that the power consumption may increase.

In addition, in the solid-state imaging device disclosed in JP-A-2010-28423, in a case where pixel read-out modes including a normal imaging mode and one or more high-speed shutter imaging (multiple-speed imaging) modes are arranged, it is difficult to dynamically change the configuration of a frame in accordance with a change of the pixel read-out mode.

Therefore, according to this solid-state imaging device, it is difficult to realize imaging with high efficiency in accordance with the read-out mode, in addition to high precision.

It is desirable to provide a solid-state imaging device and a camera system that can realize imaging with high precision and high efficiency in accordance with a read-out mode.

In addition, it is desirable to provide a solid-state imaging device and a camera system that can realize high-speed shutter imaging with low power consumption.

An embodiment of the present technology is directed to a solid-state imaging device including: a pixel unit in which a plurality of pixels are arranged in a matrix pattern; and a pixel signal read-out unit that includes an AD conversion unit that performs analog-to-digital (AD) conversion of a pixel signal that is read out from the pixel unit. Each pixel included in the pixel unit includes a plurality of division pixels that are divided into regions in which photosensitivity levels or electric charge accumulating amounts are different from one another, the pixel signal reading unit includes a normal read-out mode in which signals are sequentially read out for each row and a multiple read-out mode in which signals are read out from a plurality of rows in a simultaneous and parallel manner as read-out modes in which division pixel signals of each division pixel of the pixel are read out, performs read-out at a speed corresponding to the times of the number of the pixels that are read out in a simultaneous and parallel manner, and includes a function of changing a configuration of a frame in accordance with a change of the read-out mode, and the AD conversion unit acquires a pixel signal of one pixel by adding the division pixel signals read out in accordance with the read-out mode while performing AD conversion for the division pixel signals.

Another embodiment of the present technology is directed to a solid-state imaging device including: a pixel unit in which a plurality of pixels are arranged in a matrix pattern; and a pixel signal read-out unit that includes an AD conversion unit that performs analog-to-digital (AD) conversion of a pixel signal that is read out from the pixel unit. One pixel included in the pixel unit is formed as a plurality of division pixels that are divided into regions in which photosensitivity levels or electric charge accumulating amounts are different from one another, the pixel signal reading unit includes a normal read-out mode in which signals are sequentially read out for each row and a multiple read-out mode in which signals are read out from a plurality of rows in a simultaneous and parallel manner as read-out modes in which division pixel signals of each division pixel of the pixel are read out, performs read-out at a speed corresponding to the times of the number of the pixels that are read out in a simultaneous and parallel manner in the multiple read-out mode, and includes a function of changing a configuration of a frame in accordance with a change of the read-out mode, and, the AD conversion unit acquires a pixel signal of one pixel by adding the division pixel signals read out in accordance with the read-out mode while performing AD conversion for the division pixel signals.

Still another embodiment of the present technology is directed to a camera system including: a solid-state imaging device; and an optical system that forms a subject image in the solid-state imaging device. The solid-state imaging device includes a pixel unit in which a plurality of pixels are arranged in a matrix pattern and a pixel signal read-out unit that includes an AD conversion unit that performs analog-to-digital (AD) conversion of a pixel signal that is read out from the pixel unit. Each pixel included in the pixel unit includes a plurality of division pixels that are divided into regions in which photosensitivity levels or electric charge accumulating amounts are different from one another, the pixel signal reading unit includes a normal read-out mode in which signals are sequentially read out for each row and a multiple read-out mode in which signals are read out from a plurality of rows in a simultaneous and parallel manner as read-out modes in which division pixel signals of each division pixel of the pixel are read out, performs read-out at a speed corresponding to the times of the number of the pixels that are read out in a simultaneous and parallel manner, and includes a function of changing a configuration of a frame in accordance with a change of the read-out mode, and the AD conversion unit acquires a pixel signal of one pixel by adding the division pixel signals read out in accordance with the read-out mode while performing AD conversion for the division pixel signals.

Yet another embodiment of the present technology is directed to a camera system including: a solid-state imaging device; and an optical system that forms a subject image in the solid-state imaging device. The solid-state imaging device includes a pixel unit in which a plurality of pixels are arranged in a matrix pattern and a pixel signal read-out unit that includes an AD conversion unit that performs analog-to-digital (AD) conversion of a pixel signal that is read out from the pixel unit. One pixel included in the pixel unit is formed as a plurality of division pixels that are divided into regions in which photosensitivity levels or electric charge accumulating amounts are different from one another, the pixel signal reading unit includes a normal read-out mode in which signals are sequentially read out for each row and a multiple read-out mode in which signals are read out from a plurality of rows in a simultaneous and parallel manner as read-out modes in which division pixel signals of each division pixel of the pixel are readout, performs read-out at a speed corresponding to the times of the number of the pixels that are read out in a simultaneous and parallel manner in the multiple read-out mode, and includes a function of changing a configuration of a frame in accordance with a change of the read-out mode, and the AD conversion unit acquires a pixel signal of one pixel by adding the division pixel signals read out in accordance with the read-out mode while performing AD conversion for the division pixel signals.

According to the embodiments of the present technology, imaging with high precision and high efficiency in accordance with a read-out mode can be realized.

In addition, according to the embodiments of the present technology, high-speed shutter imaging can be realized with low power consumption.

BRIEF DESCRIPTION OF THE DRAWINGS

FIG. 1 is a diagram that illustrates a configuration example of a CMOS image sensor (solid-state imaging device) according to this embodiment.

FIGS. 15A and 15B are diagrams that illustrate a function that realizes high-speed shutter imaging with low power consumption.

FIG. 19 is a diagram that illustrates the number of AD conversion processes during 1H period and a relative frame rate according to each read-out mode.

FIGS. 20A to 20C are diagrams that illustrate addition methods in a case where division pixels are divided into two groups according to the length of an exposure time.

FIGS. 22A to 22C are diagrams that illustrate pixel driving timing in association with FIG. 21 in a case where addition is performed in a diagonal direction, addition is performed in the vertical direction, and addition is performed in the horizontal direction, for easy understanding.

FIG. 29 is a diagram that illustrates a configuration example of a solid-state imaging device corresponding to a CCD sensor according to an embodiment of the present technology.

DETAILED DESCRIPTION

Figure 2A:
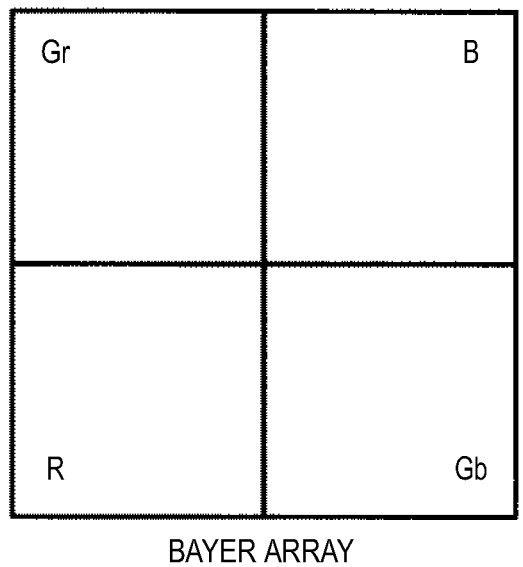
FIGS. 2A and 2B are diagrams that illustrate a Bayer array as an example of pixel arrangement.

Here, embodiments of the present technology will be described with reference to the drawings.

The description will be presented in the following order.
1. Schematic Configuration of Whole Solid-state Imaging Device
2. Countermeasure for Gravity Center Shift
3. S/N Countermeasure
4. Detailed Description of Read-out mode 5. Function for Realizing High-Speed Shutter Imaging with Low Power Consumption 6. Function for Realizing Imaging with High Precision and High Efficiency according to Read-out Mode 7. Addition Method in Case Where Division Pixels Are Divided into Two Groups according to Length of Exposure Time 8. Configuration Example of Division Pixels 9. Configuration Example of Camera System <1. Schematic Configuration of Whole Solid-state Imaging Device>

FIG. 1 is a block diagram that illustrates a configuration example of a column-parallel ADC mounted solid-state imaging device (CMOS image sensor) according to this embodiment.

Although the present technology can be applied not only to a CMOS image sensor but also to a CCD, here, as an example, the CMOS image sensor will be described.

This solid-state imaging device 100, as illustrated in FIG. 1, includes a pixel unit 110, a vertical scanning circuit 120, a horizontal transmission scanning circuit 130, a timing control circuit 140, and an analog digital converter (ADC) group 150 as a column processing unit.

The solid-state imaging device 100 further includes a digital analog converter (DAC) 160, an amplification circuit (S/A) 170, a signal processing circuit 180, and a horizontal transmission line 190.

The vertical scanning circuit 120, the horizontal transmission scanning circuit 130, the timing control circuit 140, the ADC group 150, and the DAC 160 configure a pixel signal reading unit.

The solid-state imaging device 100 according to this embodiment has three read-out modes including a first read-out mode RMD1, a second read-out mode RMD2, and a third read-out mode RMD3.

The first read-out mode RMD1 is a full-pixel read-out mode in which full-pixel reading is performed for each one pixel by performing a shuttering operation for every row (line).

The second read-out mode RMD2 is a double-speed read-out mode in which reading is performed in a simultaneous and parallel manner for every two pixels.

The third read-out mode RMD3 is a quad-speed read-out mode in which reading is performed in a simultaneous and parallel manner for every four pixels.

The first read-out mode RMD1 corresponds to a normal read-out mode, and the second read-out mode RMD2 and the third read-out mode RMD3 correspond to a multiple read-out mode.

The pixel unit 110 is configured by arranging a plurality of pixels in a matrix pattern.

Figure 2B:
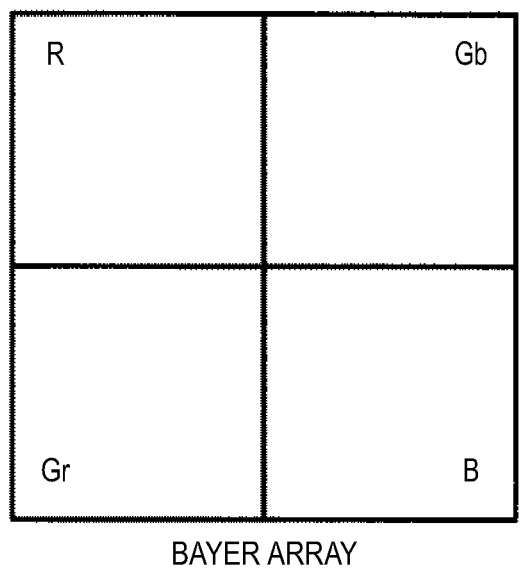

In the pixel unit 110, for example, a Bayer array as illustrated in FIG. 2A or 2B is employed as the pixel arrangement.

In the pixel unit 110 of this embodiment, one pixel is divided into a plurality of division pixel cells DPCs each including a photoelectric conversion device that is formed, for example, by a photodiode.

More specifically, in the solid-state imaging device (CMOS image sensor) 100 in which a column-parallel ADC is mounted, one pixel disposed under color filters of the same color in the Bayer array is divided into two or more division pixel cells DPCs by changing the sensitivity level or the accumulation time.

In this embodiment, as described above, as the read-out modes, there are the first read-out mode in which full-pixel reading is performed at normal read-out speed and the second and third read-out modes in which reading is performed at speed higher than that of the first read-out mode.

Basically, in a case where one pixel is divided into n division pixels, reading is performed at speed that is n/2 times the normal speed in the second read-out mode, and reading is performed at speed that is n times the normal speed in the third read-out mode.

In a case where one pixel, for example, is divided into four (n=4), while reading is performed at 30 fps in the first read-out mode, reading is performed at 60 fps in the second read-out mode, and reading is performed at 120 fps in the third read-out mode.

Regarding an interval of reading timings adjacent to each at the time of performing consecutive reading, a CIT (Coarse Integration Time) is 30 fps, which is the same in the first read-out mode, the second read-out mode, and the third read-out mode.

According to an embodiment of the present technology, high-speed shutter imaging can be realized with low power consumption.

In addition, in this embodiment, a column process in which AD conversion is performed is configured such that the AD conversion is performed two times in 1H period (one horizontal synchronization) in the first read-out mode and the second read-out mode, and the AD conversion is performed once in 1H period in the third read-out mode.

In other words, the solid-state imaging device 100 according to this embodiment, as will be described in detail later, is configured such that the configuration of frames and the control of frames can be changed in accordance with a change in the read-out mode.

In addition, in this embodiment, the exposure time conditions (or photosensitivity levels) are set as two conditions. In such a case, as a structure that is appropriate for preventing a gravity center shift, a structure is employed in which pixels facing each other in a diagonal direction have the same exposure time (or photosensitivity).

Basically, one pixel is divided into n (here, n is an integer that is equal to or more than four) division pixels, the n division pixels are classified into M (here M is an integer that is equal to or more than two) groups, and the photosensitivity or the exposure time condition of division pixels included in each group is set to a same condition.

The solid-state imaging device 100 according to this embodiment performs a reading operation in the multiple read-out mode as follows.

In other words, in this embodiment, in a case where a plurality of division pixels, which are included in the same group, are read out from among n pixels, which have been divided, in a simultaneous and parallel manner, reading is performed at speed that is (n/M) times the speed of the normal read-out mode in a period of a frame that is (M/n) times the frame of the normal read-out mode.

In this embodiment, n=4, and M=2.

In such a case, a wide dynamic range mode WDM as a second read-out mode in which two division pixels having the same condition are read out in a simultaneous and parallel manner can be applied.

In the case of the wide dynamic range mode WDM, when one pixel, for example, is divided into four division pixels (n=4), while reading is performed at 30 fps in the first read-out mode, reading is performed at 60 fps in the wide dynamic range mode WDM.

Regarding an interval of reading timings that are adjacent to each other at the time of consecutive reading, a CIT (Coarse Integration Time) is 30 fps, which is the same in the first read-out mode and the wide dynamic range mode WDM.

According to an embodiment of the present technology, imaging with high precision and high efficiency according to the read-out mode can be realized.

In addition, in this embodiment, in order to maximize the S/N, when the signal is returned to be linear, instead of directly calculating a final output, a configuration is employed in which an optimal magnification is calculated once based on a raw output value, and a final output is acquired by multiplying the raw output value by the magnification.

In addition, when AD conversion is performed for a pixel signal and the converted pixel signal is output in the column direction, output division pixel signals of the division pixels are added, and the AD conversion is performed. At this time, an input range for the AD conversion unit is clipped so as to be constantly equal to or less than a saturation output voltage of each pixel, whereby the output value of each pixel is necessarily a specific digital value.

In the description presented below, a case will be described as an example in which one pixel DPC is divided into four division pixel cells DPC-A to DPC-D.

Figure 3:
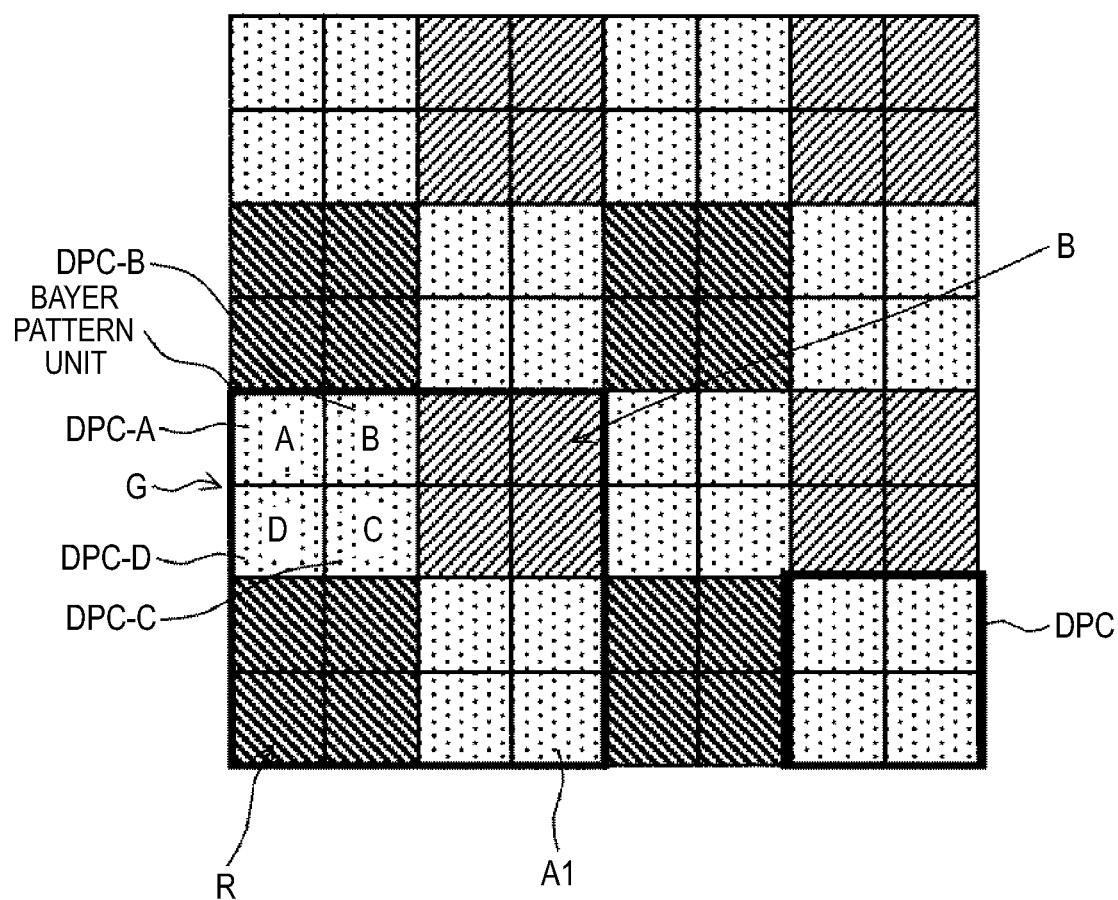
FIG. 3 is a conceptual diagram illustrating pixel division according to this embodiment.

FIG. 3 is a conceptual diagram illustrating pixel division according to this embodiment. FIG. 3 corresponds to the pixel array illustrated in FIG. 2A.

In FIG. 3, a case is illustrated in which a G (green) pixel PCG is divided into four pixels including DPC-A, DPC-B, DPC-C, and DPC-D.

In FIG. 3, a division method in the case of a Bayer array is illustrated, an example is illustrated in which one pixel under the filter of a same color is divided into four, and the sensitivity or the accumulation time is different in the divided pixels.

In other words, the divided four pixel cells have exposure times (accumulation times or photosensitivity levels) that are different from one another.

For example, in the case of the G pixel illustrated in FIG. 3, pixels DPC-A, DPC-B, DPC-C, and DPC-D have mutually different exposure times.

Alternatively, in order to prevent a gravity center shift and the like, the exposure time conditions (or the photosensitivity levels) are configured as two conditions, and pixels facing each other in a diagonal direction have the same exposure time.

For example, in the case of the G pixel illustrated in FIG. 3, the pixels DPC-A and DPC-C and the pixels DPC-B and DPC-D that respectively facing each other in the diagonal direction have the same exposure time.

In this embodiment, a two-group configuration will be described as an example, in which the exposure time conditions (or the photosensitivity levels) are set as two conditions, and pixels facing each other in the diagonal direction have the same exposure time.

The configuration of a pixel and division pixels, the division form, and the like in the pixel unit 110 will be described later in detail.

Basically, the solid-state imaging device 100 according to this embodiment, for example, transmits division pixel signals amplified within the pixel to a vertical signal line in accordance with temporal order and performs AD conversion by using an AD converter (AD conversion unit) of the ADC group 150 that is disposed in a column pixel signal reading unit.

Then, when an AD conversion operation is performed for a second division pixel signal, the solid-state imaging device 100 performs an AD conversion operation for the second division pixel signal with the first AD converted value being added thereto.

Then, when an AD conversion operation is performed for a third division pixel signal, the solid-state imaging device 100 performs an AD conversion operation for the third division pixel signal with the second AD converted value being added thereto.

Then, when an AD conversion operation is performed for a fourth division pixel signal, the solid-state imaging device 100 performs an AD conversion operation for the fourth division pixel signal with the third AD converted value being added thereto.

The solid-state imaging device according to this embodiment employs a division pixel adding method in which pixel signals of a plurality of divided pixels are added by using the AD converter that is disposed in the column processing unit.

In addition, according to this embodiment, in the second read-out mode, a process is performed in which a first added signal acquired by adding two division signals that are read out in a simultaneous and parallel manner and an added signal acquired by adding two division signals are added.

In the solid-state imaging device 100, as control circuits that are used for sequentially reading out signals of the pixel unit 110 in a simultaneous and parallel manner, the following circuits are disposed.

As the control circuits, a timing control circuit 140 that generates an internal clock signal, a vertical scanning circuit 120 that controls a row address and row scanning, and a horizontal transmission scanning circuit 130 that controls a column address and column scanning are disposed.

The ADC group 150 includes a comparator 151 that compares a reference voltage Vslop having a ramp waveform (RAMP) that is acquired by changing a reference voltage generated by the DAC 160 into a staircase pattern and an analog signal (electric potential Vsl) that is acquired from pixels through the vertical signal line LVS for each row line with each other.

In the ADC group 150, a plurality of rows of ADCs each configured by an up-down counter 152 (hereinafter, simply referred to as a counter) that counts a comparison time and a latch 153 that maintains the counting result are arranged.

The ADC group 150 has an n-bit digital signal converting function and is disposed in each vertical signal line (column line) so as to configure the column-parallel ADC block.

The output of latches 153 are connected to the horizontal transmission line 190, for example, having a width of 2n bits.

Then, 2n amplification circuits 170 and 2n signal processing circuits 180 corresponding to the horizontal transmission lines 190 are disposed.

In the ADC group 150, an analog signal (electric potential Vsl) that is read out so as to be in the vertical signal line LVS is compared with a reference voltage Vslop (a slope waveform that changes in a linear shape having a certain slope) by the comparator 151.

At this time, similarly to the comparator 151, the counter 152 is operated for each column, and, as a certain electric potential Vslop having a lamp waveform and a counter value change while having a one-to-one correspondence, the electric potential (analog signal) Vsl of the vertical signal line LVS is converted into a digital signal.

A change in the reference voltage Vslop converts a change in voltage into a change in time, and the ADC measures the time at a certain period (clock) so as to convert the time into a digital value.

When the analog electric signal Vsl and the reference voltage Vslop intersect with each other, the output of the comparator 151 is inverted, and the input clock of the counter 152 is stopped, or the clock, the input of which is stopped is input to the counter 152, whereby one AD conversion process is completed.

For example, by consecutively performing the up and down counting process of the counter in correspondence with the number of division pixel signals without resetting the counter, the addition of division pixels using the AD converter as described above is realized.

Figure 4:
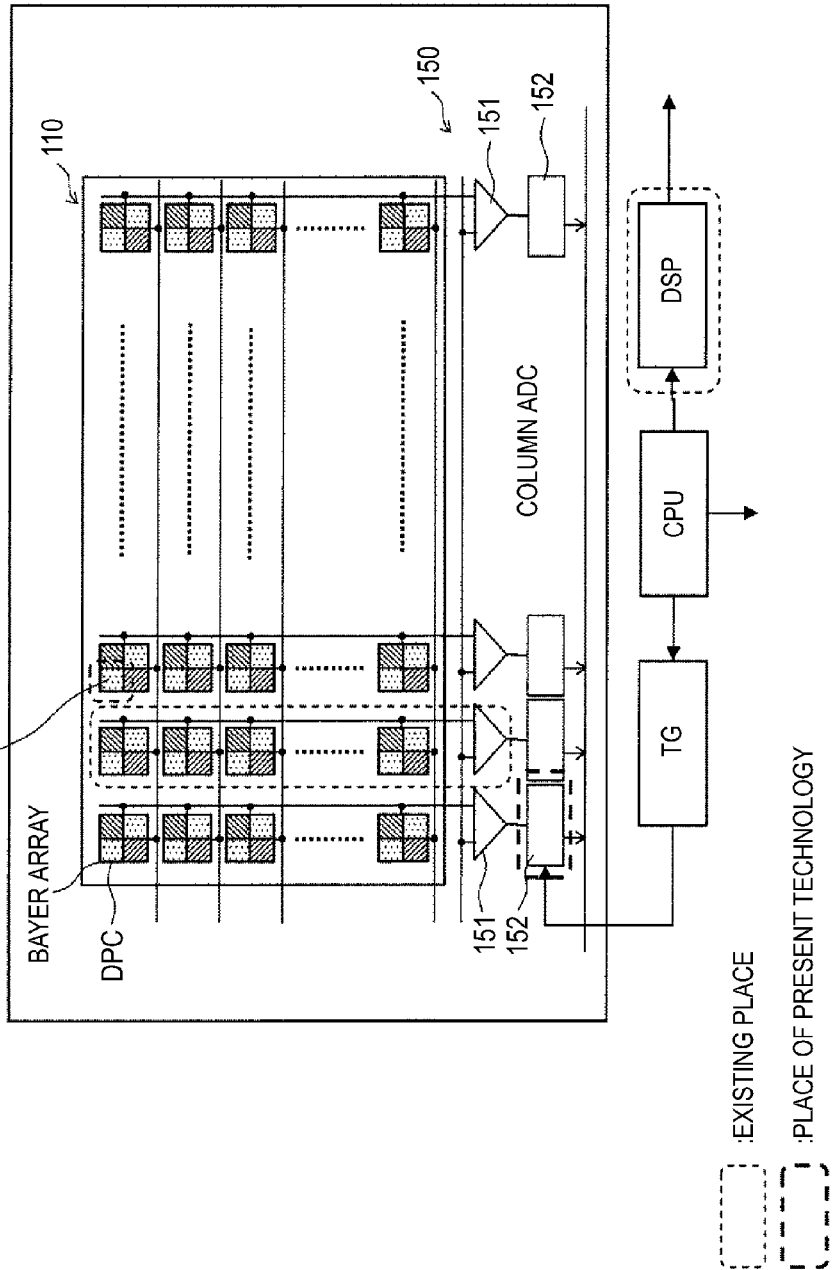
FIG. 4 is a diagram that illustrates a place at which an addition process is performed by using a column-parallel ADC-mounted solid-state imaging device (CMOS image sensor) illustrated in FIG. 1.

FIG. 4 is a diagram that illustrates a place at which an addition process is performed by using the column-parallel ADC-mounted solid-state imaging device (CMOS image sensor) illustrated in FIG. 1.

In FIG. 4, portions that are surrounded by broken lines are places at which the addition process is actually performed. A thin broken line represents an existing place, and a thick broken line represents an area according to an embodiment of the present technology.

A method of processing addition signals of division pixels, which has been known until now, is performed by a signal processing unit such as a DSP.

In contrast to this, in this embodiment, as described above, at the time of AD conversion, in the counter 152, the addition process is sequentially performed while the AD conversion of four-divided pixel signals is performed.

In other words, the division pixel signals amplified within the pixel are sequentially transmitted to the vertical signal line VSL, and AD conversion is performed by the AD converters (AD conversion units) of the ADC group 150 that is disposed in the column pixel signal reading unit.

In each ADC of the ADC group 150, thereafter, when an AD conversion operation for the second division pixel signal is performed, the AD conversion operation for the second division pixel signal is performed with the first AD converted value added thereto.

In the ADC of the ADC group 150, thereafter, when an AD conversion operation for the third division pixel signal is performed, the AD conversion operation for the third division pixel signal is performed with the second AD converted value added thereto.

In the ADC of the ADC group 150, thereafter, when an AD conversion operation for the fourth division pixel signal is performed, the AD conversion operation for the fourth division pixel signal is performed with the third AD converted value added thereto.

After the end of the above-described AD conversion period, data that is maintained by the latch 153 is transmitted to the horizontal transmission line 190 by the horizontal transmission scanning circuit 130 and is input to the signal processing circuit 180 through the amplification circuit 170, and a two-dimensional image is generated by predetermined signal processing.

As above, the basic configuration and function of the embodiment of the present technology have been described.

Hereafter, the configurations of a pixel and a division pixel, the division form, a countermeasure for a gravity center shift, a countermeasure for an S/N, a division pixel adding process, and the like will be described in more detail, which are featured configurations of this embodiment.

In addition, a specific configuration and a specific process for realizing high-speed shutter imaging with low power consumption and a specific configuration and a specific process for realizing imaging with high precision and high efficiency in accordance with a read-out mode will be described.

Furthermore, an addition method will be described for a case in which n (=4) division pixels are divided into two groups in accordance with of the length of the exposure time.

First, a countermeasure for a gravity center shift and a countermeasure for an S/N, which are features of this embodiment, will be described.

In a case where the photosensitivity or the exposure amount differs for four pixels DPC-A to DPC-D of each pixel RGB, the gravity center position differs for each pixel, and accordingly, there is concern that correction of the gravity center shift is necessary.

The reason for the necessity of the correction for a gravity center shift due to a difference in the gravity center position of each pixel will be described with reference to FIGS. 5, 6, and 7.

Figure 5:
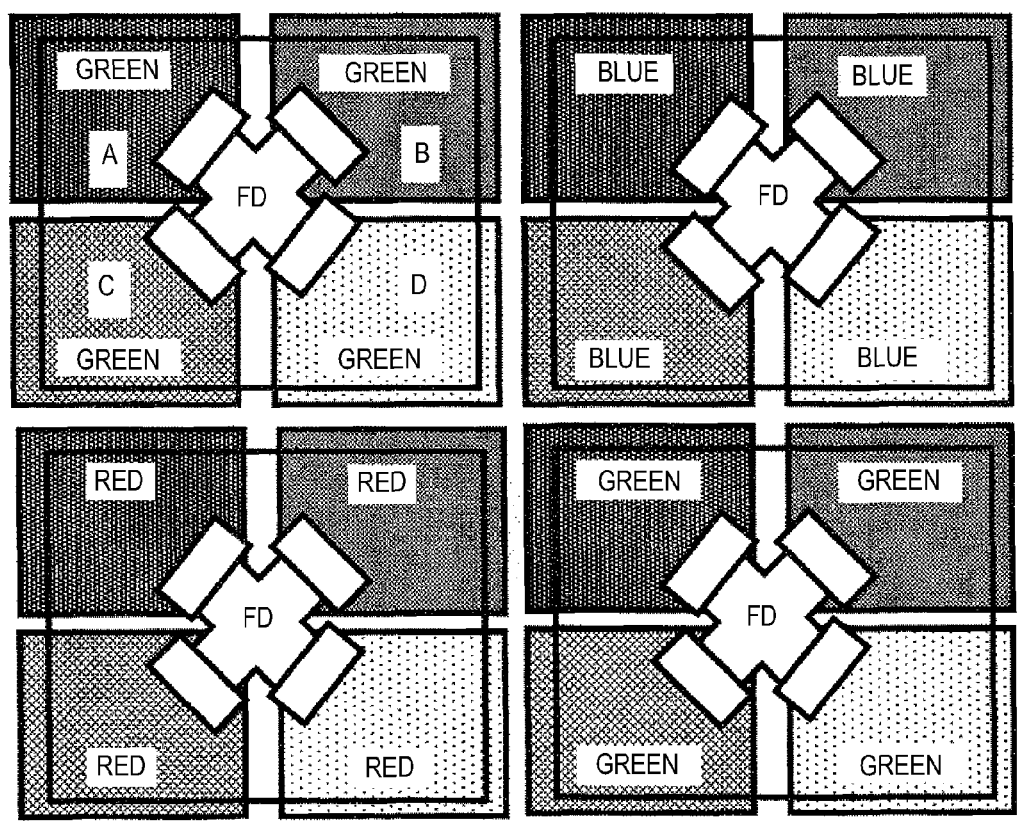
FIG. 5 is a diagram that illustrates a method of realizing a wide dynamic range by changing each accumulation time of four pixels.

FIG. 5 is a diagram that illustrates a method of realizing a wide dynamic range by changing each accumulation time of four pixels.

Figure 6:
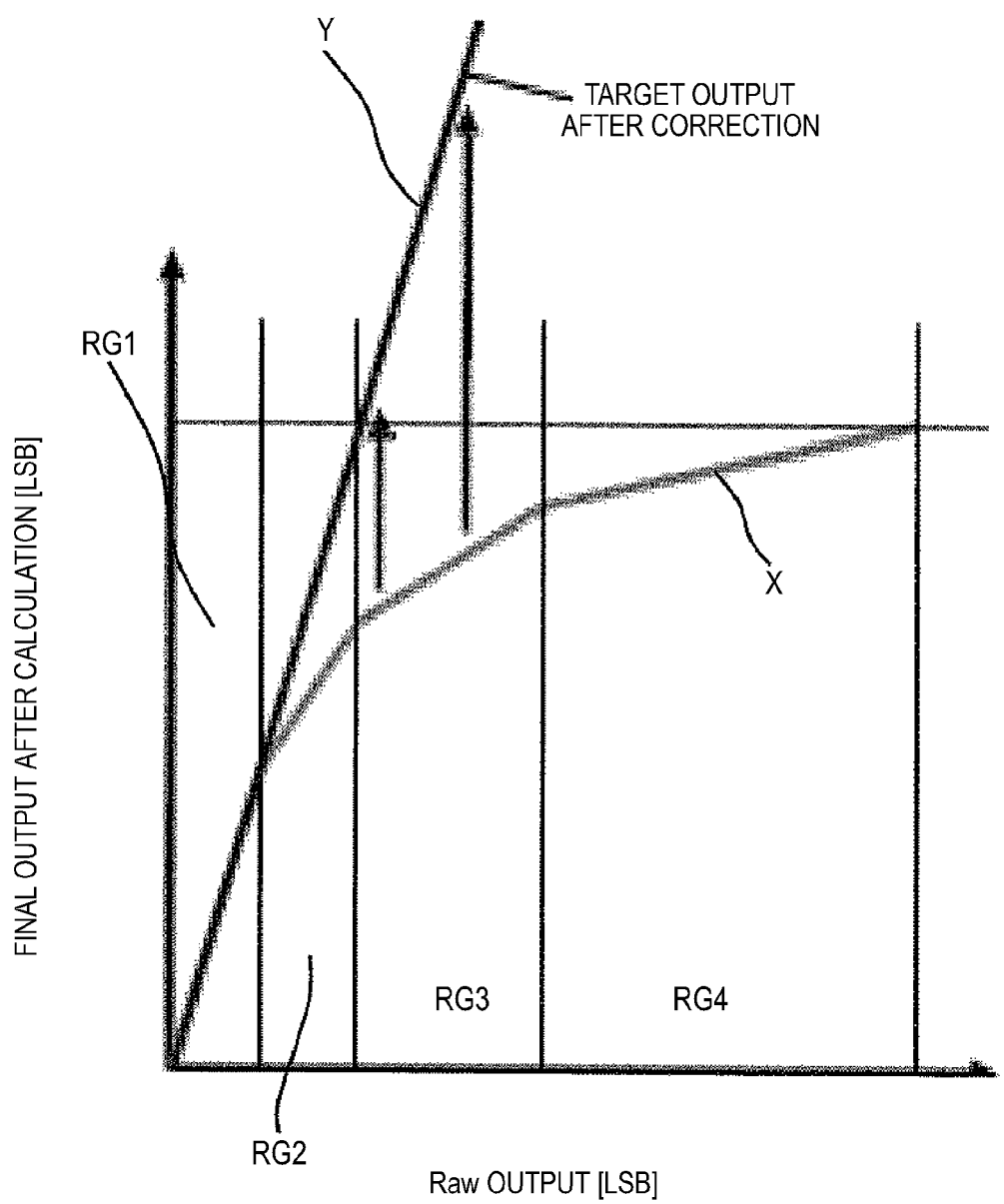
FIG. 6 is a diagram that illustrates the relation between a raw output and a final output after calculation and is a diagram for considering an S/N problem in the method of realizing a wide dynamic range by changing each accumulation time of four pixels.

FIG. 6 is a diagram that illustrates the relation between a raw output and a final output after calculation and is a diagram for considering an S/N problem in the method of realizing a wide dynamic range by changing each accumulation time of four pixels.

Figure 7:
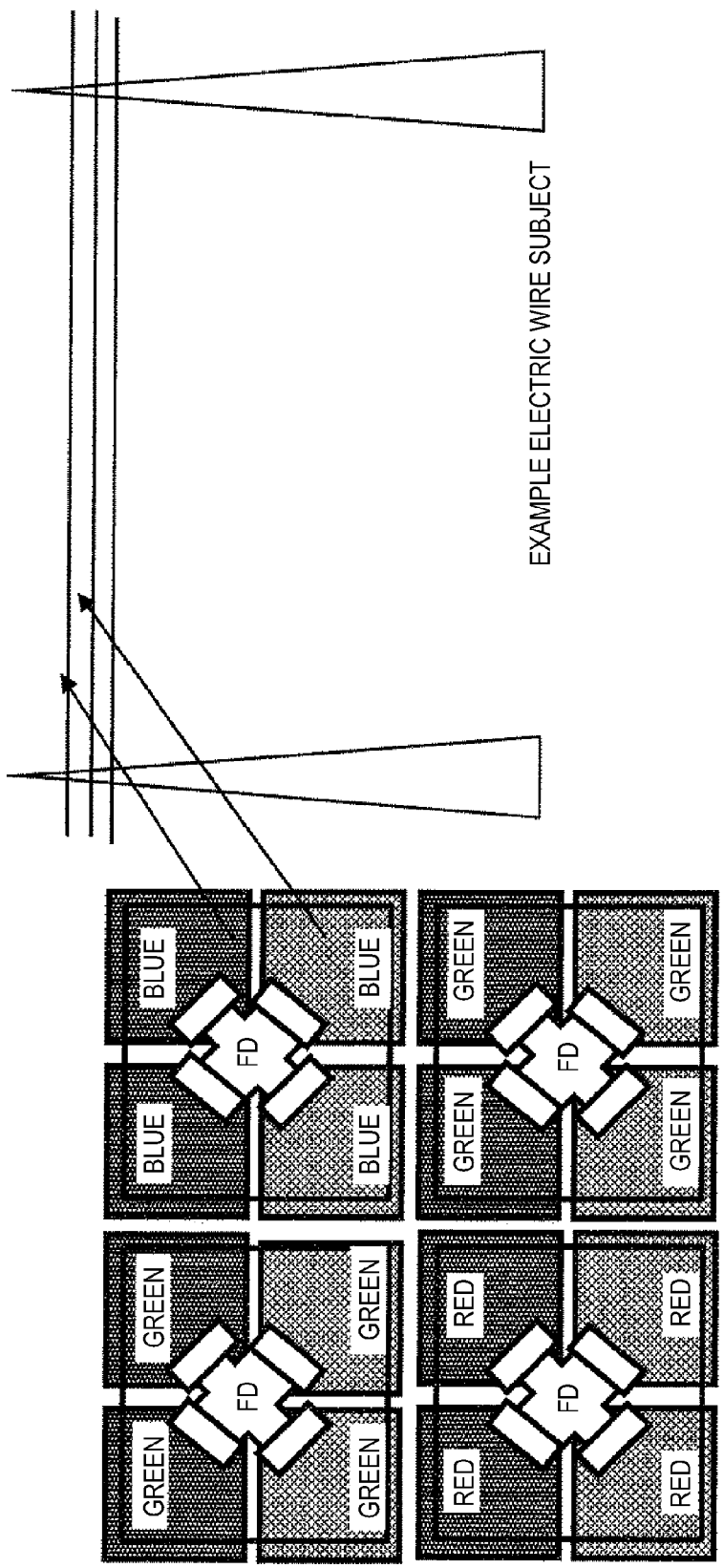
FIG. 7 is a diagram for considering a problem due to a different gravity center position in the method of realizing a wide dynamic range by changing each accumulation time of four pixels.

FIG. 7 is a diagram for considering a problem due to a different gravity center position in the method of realizing a wide dynamic range by changing each accumulation time of four pixels.

In this method, divided four pixels of each single color of R, G or B are used.

As an example, as denoted by signs A to D in G (green) located on the upper left side in FIG. 5, a structure is employed in which four pixels having different photosensitivity levels or exposure amounts are included. In addition, in FIG. 5, reference sign FD denotes a floating diffusion portion.

By adding the outputs of these four pixels, a wide dynamic range is realized.

According to the embodiment of the present technology, the addition of division pixels can be realized in which there is no unbalance between the numbers of output electrons of pixels with respect to the incident light amount, and a wide dynamic range can be realized in which the sensitivity is high for low intensity of incident light, the sensitivity is lowered for high intensity of incident light, and the output is not saturated.

However, in the configuration illustrated in FIG. 5, there is concern that the correction of a gravity center shift is necessary due to different gravity center positions of the pixels.

As illustrated in FIG. 6, there is concern that the S/N may not be maximized depending on the calculation performed at the time of linearly returning the output signal from line X to line Y.

The problem of a gravity center shift will be described in more detail.

In a case where the sensitivity or the exposure changes for four pixels, the gravity center positions of the four pixels are scattered, and accordingly, the correction for the gravity center shift is necessary.

More simply, also in a case where the sensitivity or the exposure changes for two pixels, the gravity center positions of the four pixels are scattered, and accordingly, the correction for the gravity center shift is necessary.

In a case where the gravity center positions are different from one another, there is concern that there may be the following disadvantages.

In a case where the gravity center positions are different from each other, not only the correction for the gravity center shift is necessary, but also, for example, in a case where a longitudinal subject such as an electric wire is imaged, for example, as illustrated in FIG. 7, using pixels of which the sensitivity levels or the accumulation amounts are vertically different from each other, there is concern that images acquired by an upper pixel and a lower pixel are different from each other.

This may be a factor that causes the generation of a false color or a noise.

Next, the problem of the S/N will be described further in detail.

In a case where a signal is generated from four pixels that have mutually different sensitivity levels or exposure amounts, it is necessary for final output values, as denoted by Y in FIG. 6, to be linear with respect to the light intensity.

Since acquired raw signal values form a bent state based on regions RG1 to RG4 illustrated in FIG. 6, it is necessary for the output value to be linear as denoted by line Y.

As an example of a calculation method using at that time, the following may be considered.

$$y=ax \quad \text{Equation Region "RG1"}$$

$$y'=cx+d \text{ (here, } x \text{ is an acquired signal value, and } y \text{ is a final output)} \quad \text{Equation Region "RG2"}$$

In such a case, in order to superimpose Equation "RG2" into Equation "RG1", by subtracting intersect d from Equation "RG2" so as to set the intersect to zero and then multiplying a resultant equation by a/c, Equation "RG2" can be formed to be linear to Equation "RG1".

However, considering the S (Signal)/N (Noise), by subtracting intersect d that is subtracted here, in a sense, only S (Signal) is subtracted, and the applied a/c is applied to both the signal and the noise (since it is difficult to subtract the noise).

Accordingly, the S/N lowers greatly as compared to that before calculation.

Thus, in this embodiment, the countermeasure for a gravity center shift and the countermeasure for an S/N are taken.

<2. Countermeasure for Gravity Center Shift>

Figure 8:
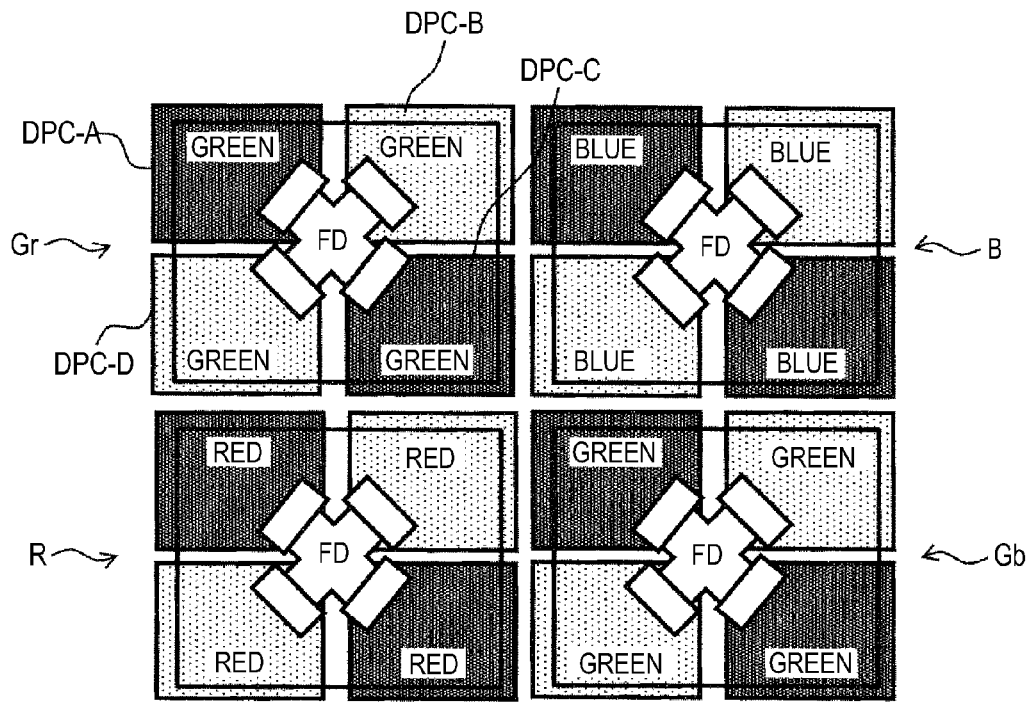
FIG. 8 is a diagram that illustrates a two-pixel pair angle method as a first countermeasure for a gravity center shift according to this embodiment.

FIG. 8 is a diagram that illustrates a two-pixel pair angle method as a first countermeasure for a gravity center shift according to this embodiment.

In the two-pixel pair angle method illustrated in FIG. 8, the conditions of the photosensitivity or the exposure amount are configured as two kinds, and each diagonal pixels is set to have the same condition.

In the example illustrated in FIG. 8, in pixel Gr, pixel DPC-A, which is located on the upper left side, and pixel DPC-C, which is located on the lower right side, facing each other in the diagonal direction have a first condition at which the sensitivity or the exposure amount is the same. Similarly, in pixel Gr, pixel DPC-B, which is located on the upper right side, and pixel DPC-D, which is located on the lower left side, facing each other in the diagonal direction have a second condition at which the sensitivity or the exposure is the same.

For example, it may be configured such that the first condition is a long exposure-time condition and the second condition is a short exposure-time condition that is shorter than that of the first condition, or the opposite conditions may be configured.

This similarly applies to the other pixels Gb, R, and B.

Since the gravity center of signals that are finally added by the floating diffusion portion FD is collected at the gravity center of the four pixels Gr, Gb, R, and B, the correction of a gravity center shift is not necessary, and the pixels are strong for a line-shaped subject disposed in the horizontal direction and the vertical direction.

Figure 9:
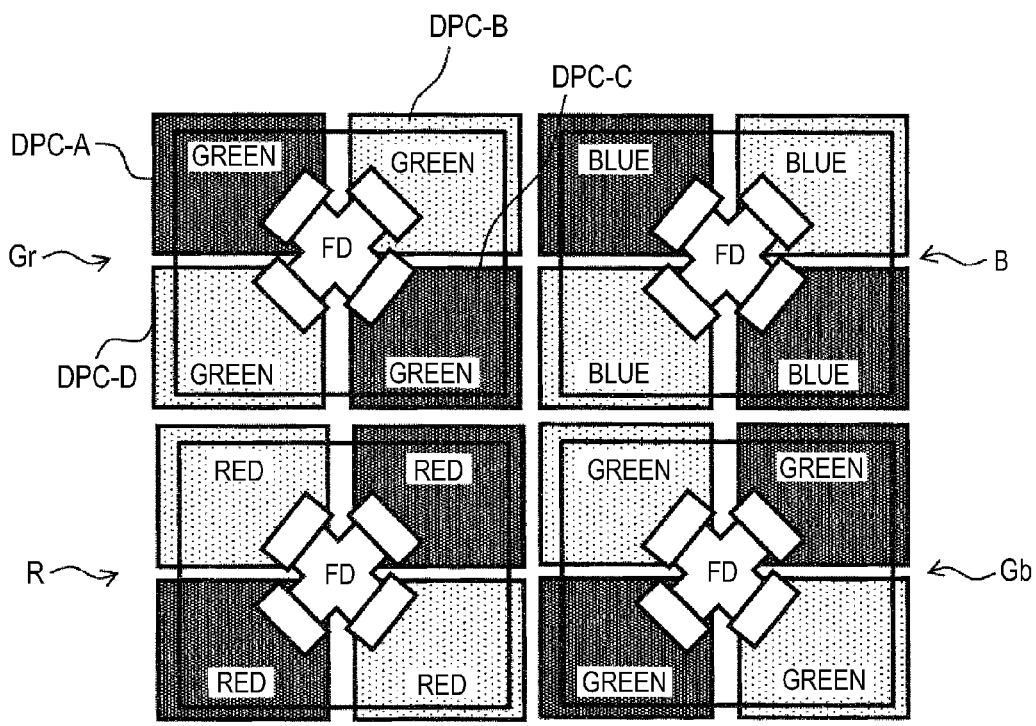
FIG. 9 is a diagram that illustrates a two-pixel pair angle Gr/Gb inverting method as a second countermeasure for a gravity center shift according to this embodiment.

FIG. 9 is a diagram that illustrates a two-pixel pair angle Gr/Gb inverting method as a second countermeasure for a gravity center shift according to this embodiment.

In the two-pixel pair angle Gr/Gb inverting method illustrated in FIG. 9, the direction of the condition of the sensitivity or the exposure amount of pixel G in columns B and R is changed.

In the example illustrated in FIG. 9, in pixel Gr, pixel DPC-A, which is located on the upper left side, and pixel DPC-C, which is located on the lower right side, facing each other in the diagonal direction have the first condition at which the sensitivity or the exposure is the same. In pixel Gr, pixel DPC-B, which is located on the upper right side, and pixel DPC-D, which is located on the lower left side, facing each other in the diagonal direction have the second condition at which the sensitivity or the exposure is the same.

In such a case, in pixel R, pixel DPC-A, which is located on the upper left side, and pixel DPC-C, which is located on the lower right side, facing each other in the diagonal direction have the second condition at which the sensitivity or the exposure is the same. In pixel R, pixel DPC-B, which is located on the upper right side, and pixel DPC-D, which is located on the lower left side, facing each other in the diagonal direction have the first condition at which the sensitivity or the exposure is the same.

In addition, in pixel Gb, pixel DPC-A, which is located on the upper left side, and pixel DPC-C, which is located on the lower right side, facing each other in the diagonal direction have the second condition at which the sensitivity or the exposure is the same. In pixel Gb, pixel DPC-B, which is located on the upper right side, and pixel DPC-D, which is located on the lower left side, facing each other in the diagonal direction have the first condition at which the sensitivity or the exposure is the same.

In such a case, in pixel B, pixel DPC-A, which is located on the upper left side, and pixel DPC-C, which is located on the lower right side, facing each other in the diagonal direction have the first condition at which the sensitivity or the exposure is the same. In pixel B, pixel DPC-B, which is located on the upper right side, and pixel DPC-D, which is located on the lower left side, facing each other in the diagonal direction have the second condition at which the sensitivity or the exposure is the same.

In the two-pixel pair method, although it is considered that there remains slight concern that a gravity center shift may occur for a line-shaped subject in the diagonal direction, by changing the direction of the conditions of the sensitivity or the exposure amount in pixels G in rows B and R, a layout that has a tolerance for the slope can be realized.

Figure 10:
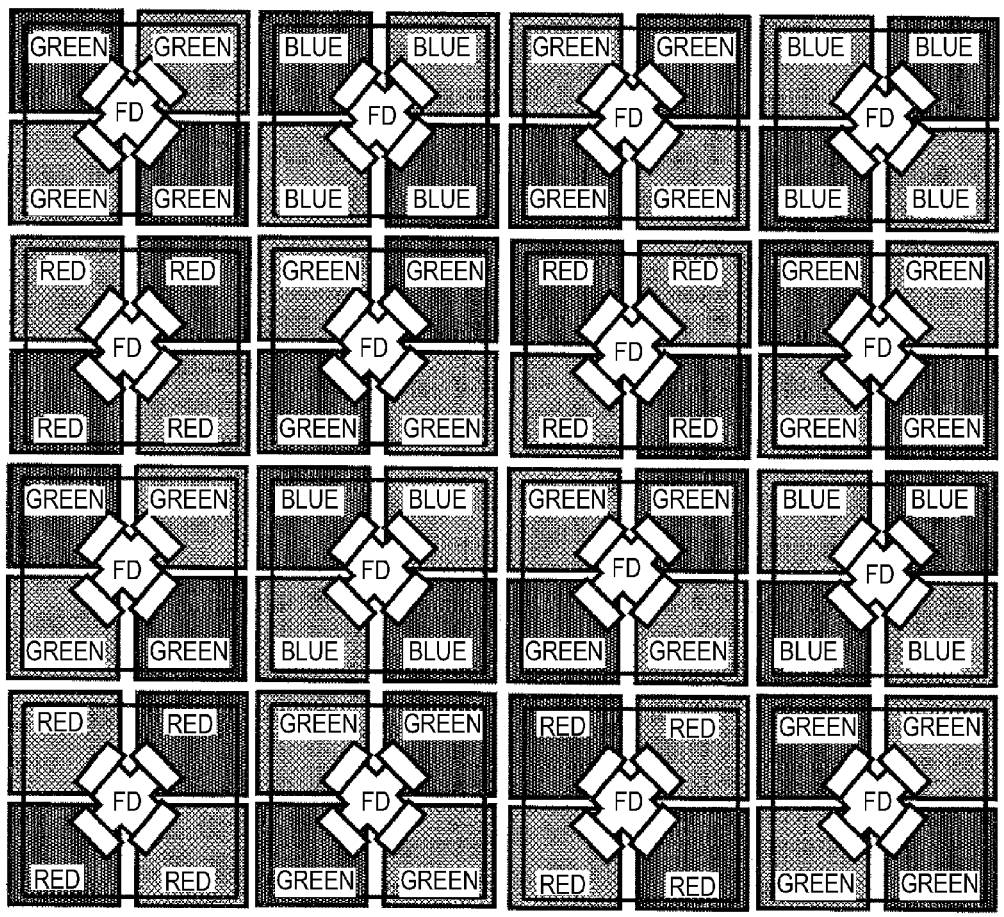
FIG. 10 is a diagram that illustrates an application example of the two-pixel pair angle Gr/Gb inverting method as the second countermeasure for a gravity center shift according to this embodiment.

In addition, by further applying the two-pixel pair angle Gr/Gb inverting method, as illustrated in FIG. 10, an array that is strong also for a false color and a noise of signals B and R can be formed by devising an array in units of 8 pixels×8 pixels.

Although the examples illustrated in FIGS. 8 to 10 correspond to the pixel array shown in FIG. 2A, similar configurations may be employed also for the pixel array shown in FIG. 2B.

<3. Countermeasure for S/N>

Figure 11:
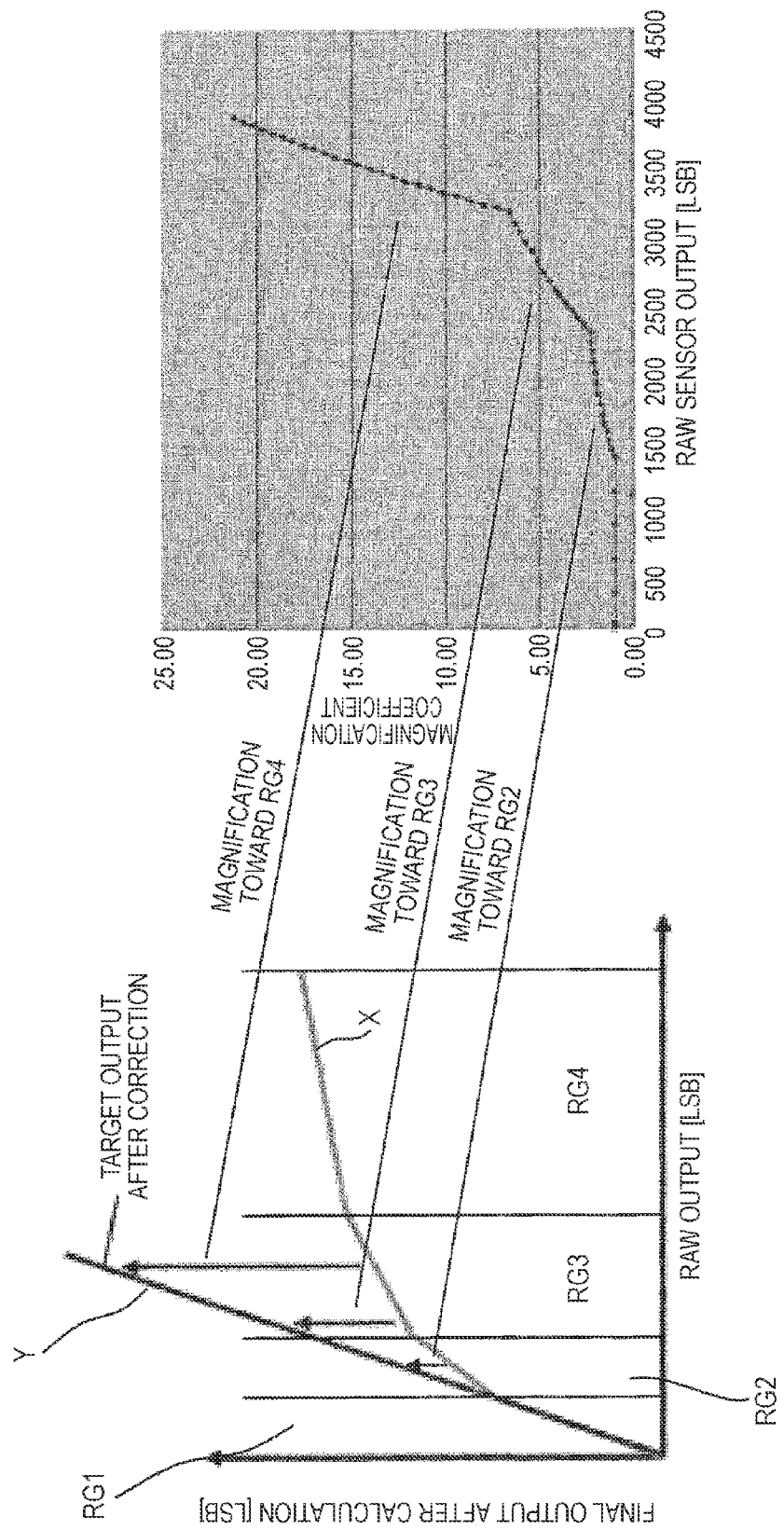
FIG. 11 is a diagram that illustrates a countermeasure for an S/N according to this embodiment.

FIG. 11 is a diagram that illustrates a countermeasure for an S/N according to this embodiment.

In FIG. 11, for easy understanding, reference signs assigned similarly to those illustrated in FIG. 6, and FIG. 6 may be referred to for the description.

As described with reference to FIG. 6, by subtracting the intersect of the equation from the equation, the intersect is also subtracted from the signal, and accordingly, there is concern that the S/N may be degraded.

In other words, according to an existing method, in order to form a target output based on a raw sensor output, calculations are made directly from the equation. Accordingly, there is concern that the S/N may be degraded due to a subtraction component (applied only to the signal) and a multiplication component (applied also to the noise).

In contrast to this, in this embodiment, in order to prevent the degradation of the S/N, a magnification for a target value is calculated once based on the acquired signal value, and, by calculating "the acquired signal value×the magnification", the intersect (signal) can remain.

In other words, a magnification is calculated based on the raw sensor output.

By directly applying the magnification to the raw sensor output (there is no subtraction), the S/N can be maintained.

As above, the "countermeasure for an S/N" according to this embodiment is a technique in which a signal value is calculated after the read-out of the pixel signal, and the output is performed with the magnification being changed in accordance with the acquired signal value.

As examples of the calculation method, there are a method in which a magnification table for each output value is included and a method in which a numerical formula is used for the calculation.

Such calculations are performed by any one of systems after the read-out of a pixel signal. For example, it may be configured such that the process is performed by the signal processing circuit 180.

<4. Detailed Description of Read-Out Mode>

As described above, the solid-state imaging device 100 according to this embodiment has three read-out modes including the first read-out mode RMD1, the second read-out mode RMD2, and the third read-out mode RMD3.

The first read-out mode RMD1 is a full-pixel read-out mode in which full-pixel reading is performed for each one pixel by performing a shuttering operation for each one row (line).

The second read-out mode RMD2 is a double-speed read-out mode in which reading is performed in a simultaneous and parallel manner for each two pixels.

The third read-out mode RMD3 is a quad-speed read-out mode in which reading is performed in a simultaneous and parallel manner for each four pixels.

Figure 12:
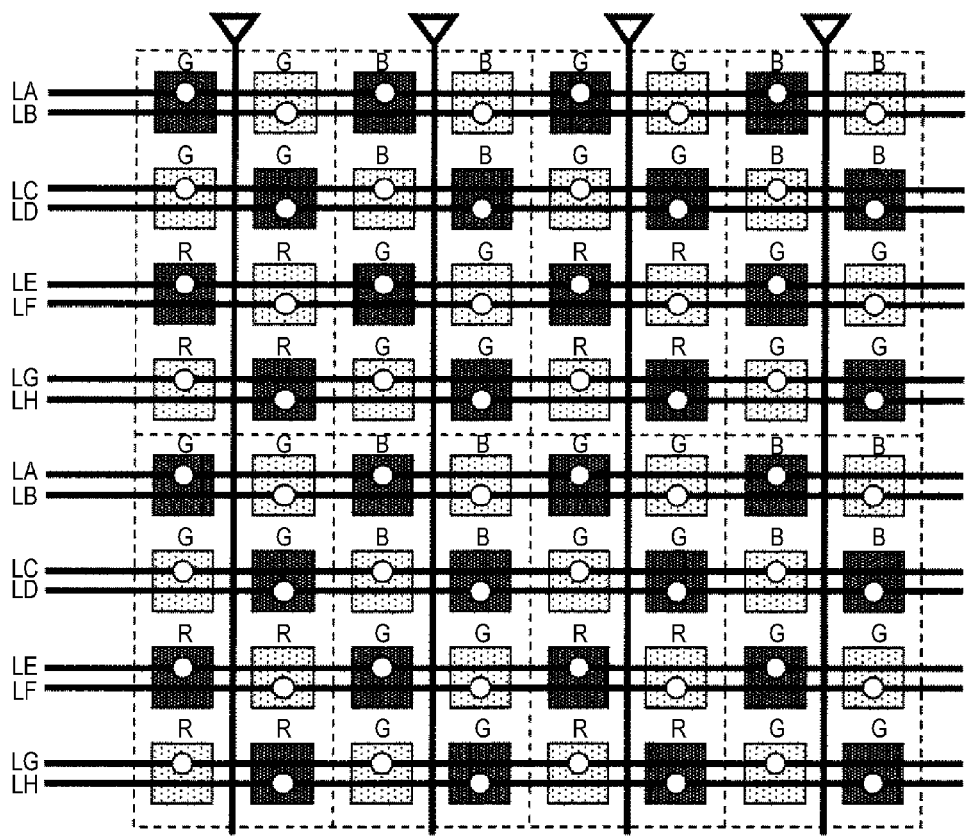
FIG. 12 is a diagram that illustrates a first read-out mode in which full-pixel reading is performed.

FIG. 12 is a diagram that illustrates the first read-out mode in which full-pixel reading is performed.

Figure 13:
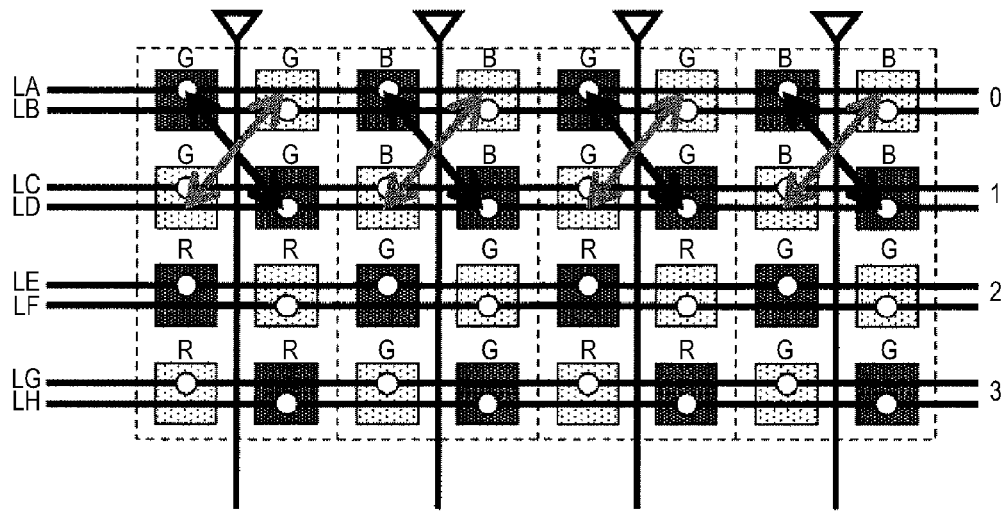
FIG. 13 is a diagram that illustrates a second read-out mode in which double-speed reading is performed for each two pixels in a simultaneous and parallel manner.

FIG. 13 is a diagram that illustrates the second read-out mode in which double-speed reading is performed for each two pixels in a simultaneous and parallel manner.

Figure 14:
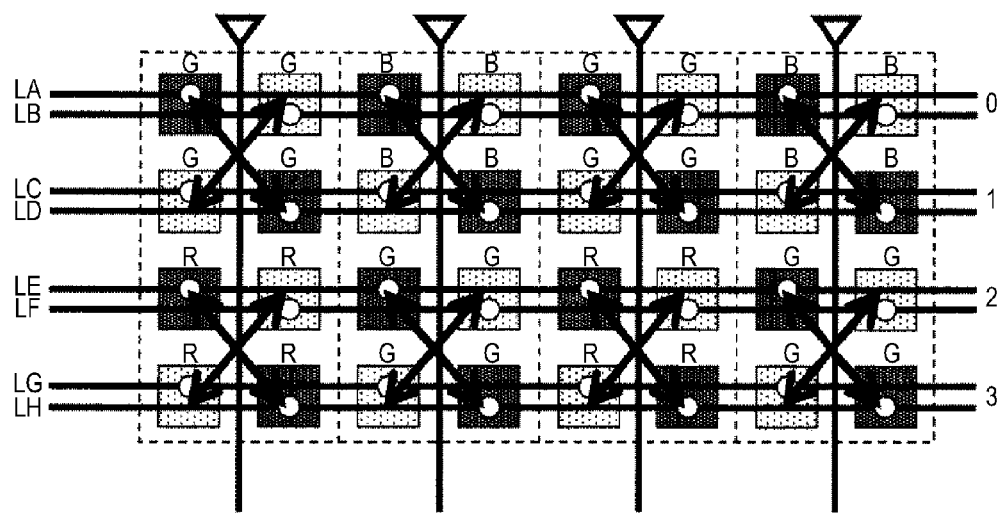
FIG. 14 is a diagram that illustrates a third read-out mode in which quad-speed reading is performed for each four pixels in a simultaneous and parallel manner.

FIG. 14 is a diagram that illustrates the third read-out mode in which quad-speed reading is performed for each four pixels in a simultaneous and parallel manner.

As the pixel array of FIGS. 12, 13, and 14, the pixel array illustrated in FIG. 8 is used.

In the first read-out mode RMD1, control lines LA, LB, . . . , LH, LA, . . . formed so as to be in correspondence with the division pixels illustrated in FIG. 12 are sequentially driven so as to sequentially read out one pixel at a time in each column, whereby full-pixel reading is performed.

In the second read-out mode RMD2, out of controls lines LA, LB, . . . , LH that are formed to be in correspondence with the division pixels illustrated in FIG. 13, two control lines LA and LD, which are adjacent to each other, are driven in a simultaneous and parallel manner. Accordingly, reading two division pixels facing each other in the diagonal direction, which for example, satisfy the first condition at which the sensitivity or the exposure amount is the same, is performed in a simultaneous and parallel manner.

Next, control lines LB and LC are driven in a simultaneous and parallel manner. Accordingly, reading two division pixels facing each other in the diagonal direction, which for example, satisfy the second condition at which the sensitivity or the exposure amount is the same, is performed in a simultaneous and parallel manner.

In the third read-out mode RMD3, out of the controls lines LA, LB, . . . , LH that are formed to be in correspondence with the division pixels illustrated in FIG. 14, four control lines LA, LB, LC, and LD that are adjacent to each other are driven in a simultaneous and parallel manner.

Accordingly, reading a total of four division pixels, for example, including two division pixels facing each other in the diagonal direction, which, for example, satisfy the first condition at which the sensitivity or the exposure amount is the same, and two division pixels facing each other in the diagonal direction, which, for example, satisfy the second condition at which the sensitivity or the exposure amount is the same is performed in a simultaneous and parallel manner.

<5. Function for Realizing High-Speed Shutter imaging with Low Power Consumption>

Next, a function for realizing high-speed shutter imaging with low power consumption in the solid-state imaging device 100 having the first read-out mode, the second read-out mode, and the third read-out mode described above will be described.

FIGS. 15A and 15B are diagrams that illustrate the function that realizes high-speed shutter imaging with low power consumption.

FIG. 15A illustrates a shuttering operation and the read-out timing in the first read-out mode in which full-pixel read-out is performed.

FIG. 15B illustrates a shuttering operation and the read-out timing in the third read-out mode in which four division pixels are read out in a simultaneous and parallel manner and a shuttering operation and the read-out timing in the second read-out mode in which two division pixels are read out in a simultaneous and parallel manner.

In FIG. 15B, solid lines represent the timing in the third read-out mode, and broken lines represent the timing in the second read-out mode.

In FIGS. 15A and 15B, the slope represents the shutter speed and the read-out speed, Vsync represents a vertical synchronization signal.

In the first read-out mode RMD1 in which full-pixel read-out is performed, as illustrated in FIG. 15A, reading is performed at a speed over one frame period.

In the third read-out mode RMD3 in which four division pixels are read out in a simultaneous and parallel manner, as illustrated in FIG. 15B, the speed is four times the speed of a case where full-pixel read-out is performed.

In other words, in the third read-out mode RMD3, the frame length is the same as that of the first reading mode RMD1, and, by only setting the speed to a quad speed, the activation ratio of the circuit can decrease.

In other words, in the third read-out mode RMD3, the shuttering operation and the read-out are performed in a period that is ¼ times of one frame. In other words, the shuttering operation and the read-out are performed once in a ¼ frame that is ¼ times of one frame.

In the second read-out mode RMD2 in which two division pixels are read out in a simultaneous and parallel manner, as illustrated in FIG. 15B, the speed is two times the speed of a case where full-pixel read-out is performed.

In other words, in the second read-out mode RMD2, the frame length is the same as that of the first reading mode RMD1, and, by only setting the speed to a double speed, the activation ratio of the circuit can decrease.

In other words, in the second read-out mode RMD2, the shuttering operation and the read-out are performed in a period that is ½ times of one frame. In other words, the shuttering operation and the read-out are performed once in a ½ frame that is ½ times of one frame.

Figure 16A:
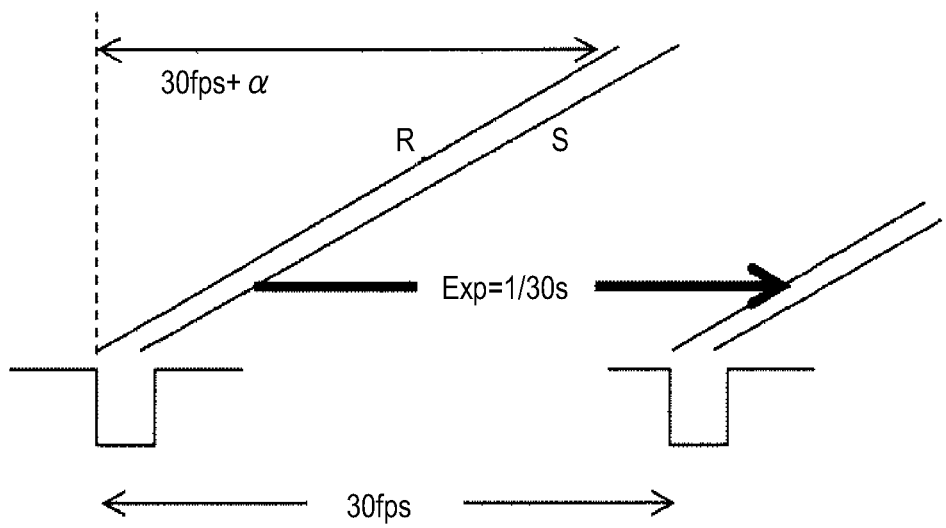
FIGS. 16A and 16B are schematic diagrams each illustrating the shuttering operation and the read-out timing in the third read-out mode in which four division pixels are read out in a simultaneous and parallel manner in comparison with normal reading.
Figure 16B:
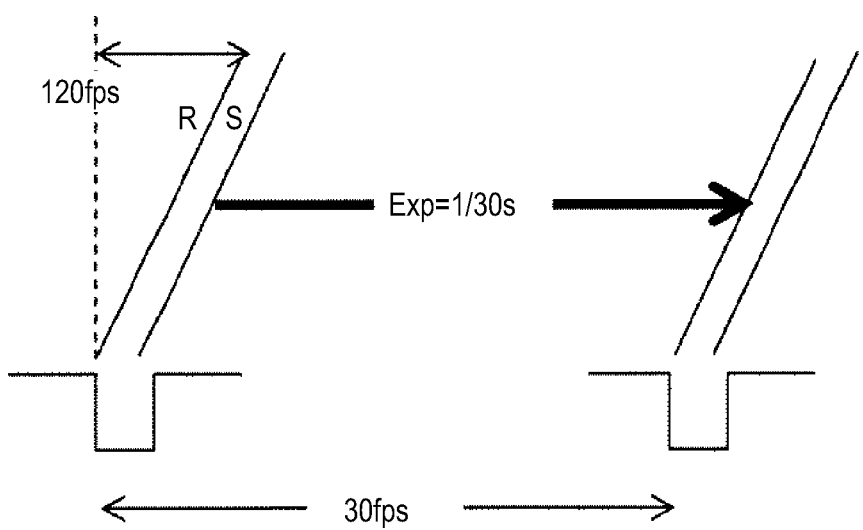

FIGS. 16A and 16B are schematic diagrams each illustrating the shuttering operation and the read-out timing in the third read-out mode in which four division pixels are read out in a simultaneous and parallel manner in comparison with normal reading.

FIG. 16A illustrates a comparative example, and FIG. 16B illustrates the shuttering operation and the read-out timing in the third read-out mode.

Figure 17A:
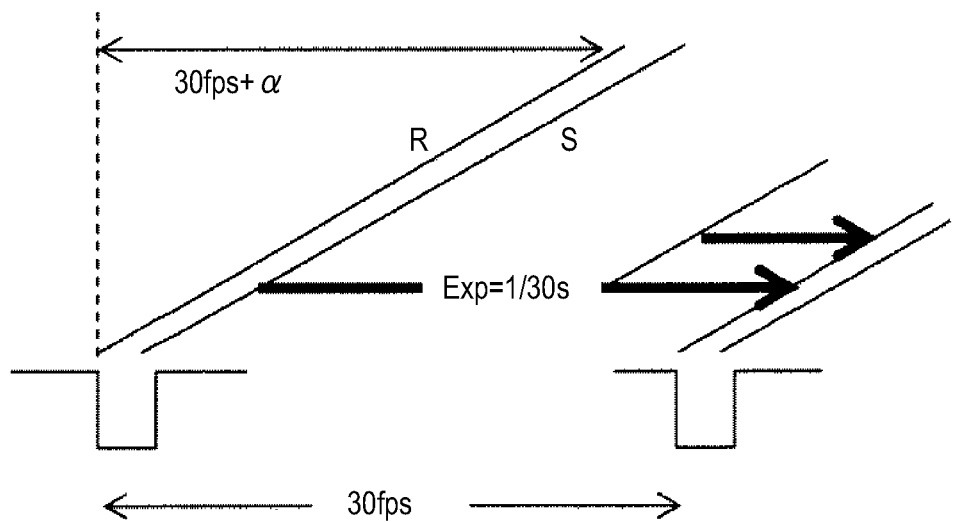
FIGS. 17A and 17B are schematic diagrams each illustrating a shuttering operation and the read-out timing in the second read-out mode in which two division pixels are read out in a simultaneous and parallel manner in comparison with normal reading.
Figure 17B:
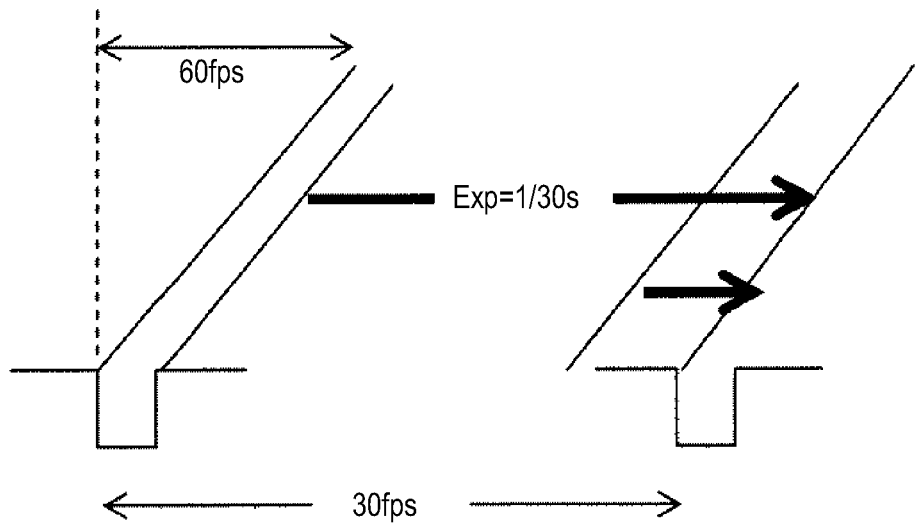

FIGS. 17A and 17B are schematic diagrams each illustrating a shuttering operation and the read-out timing in the second read-out mode in which two division pixels are read out in a simultaneous and parallel manner in comparison with normal reading.

FIG. 17A illustrates a comparative example, and FIG. 17B illustrates the shuttering operation and the read-out timing in the second read-out mode.

In this embodiment, basically, in a case where there are n division pixels, read-out is performed at a speed that is n times the normal speed in the third read-out mode RMD3, and read-out is performed at a speed that is n/2 times the normal speed in the second read-out mode RMD2.

In a case where one pixel, for example, is divided into four divisions pixels (n=4) as in this embodiment, read-out is performed at 30 fps in the first read-out mode RMD1 as illustrated in FIGS. 16A, 16B, and 17A.

In contrast to this, read-out is performed at 120 fps in the third reading mode RMD3 as illustrated in FIG. 16B.

In the second read-out mode RMD2, as illustrated in FIG. 17B, read-out is performed at 120 fps.

An exposure time Exp that is an interval between read-out timings, which are adjacent to each other, at the time of performing consecutive read-out operations is ⅓₀ s (CIT is 30 fps), which is the same in the first read-out mode RMD1, the second read-out mode RMD2, and the third read-out mode RMD3.

Generally, in a case where multiple-speed imaging is performed, while the number of pixels that are simultaneously read out for a constant read-out clock increases, in such a case, the frame rate increases in correspondence with the number of pixels. Accordingly, by perfuming read-out at the frame rate, the activation ratio of the circuit increases, whereby there is concern that the power consumption increases.

In contrast to this, according to this embodiment, the activation ratio can decrease, and accordingly, high-speed shutter imaging can be realized with low power consumption.

<6. Function for Realizing Imaging with High Precision and High Efficiency According to Read-Out Mode>

Next, in the solid-state imaging device 100 that has the first read-out mode, the second read-out mode, and the third read-out mode described above, a function for realizing imaging with high precision and high efficiency in accordance with a read-out mode will be described.

Figures 18A, 18B:
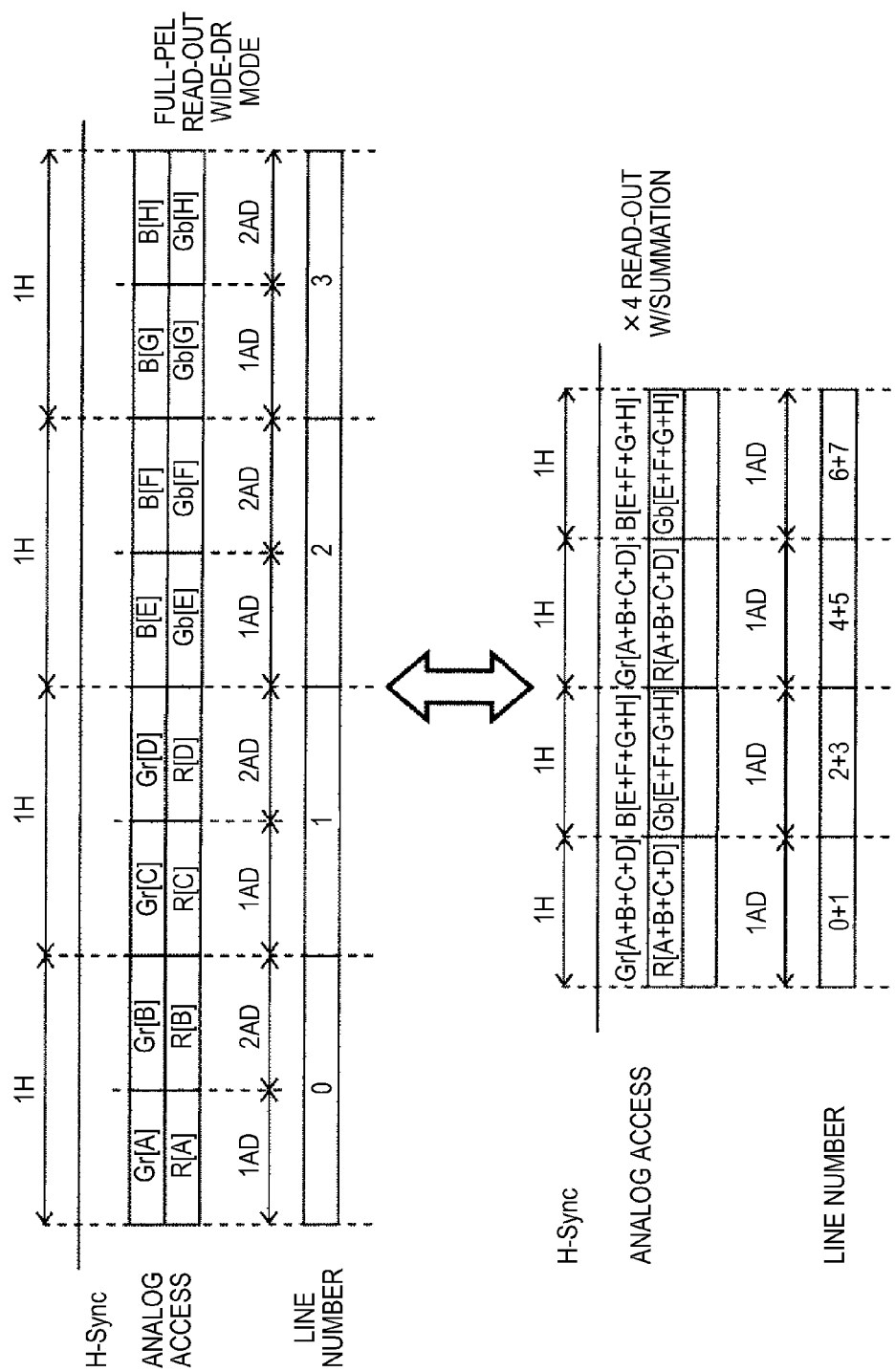
FIGS. 18A and 18B are diagrams that illustrate a function for realizing imaging with high precision and high efficiency according to each read-out mode.

FIGS. 18A and 18B are diagrams that illustrate a function for realizing imaging with high precision and high efficiency in accordance with each read-out mode.

FIG. 18A illustrates a read-out process and an AD conversion process in the first read-out mode in which full-pixel read-out is performed and in the second read-out mode in which two division pixels are read out in a simultaneous and parallel manner.

FIG. 18B illustrates a read-out process and an AD conversion process in the third read-out mode in which four division pixels are read out in a simultaneous and parallel manner.

In addition, FIG. 19 is a diagram that illustrates the number of AD conversion processes during 1H period and a relative frame rate according to each read-out mode.

In this function, the scheme of the definition of a frame is dynamically changed in accordance with the number of pixels (the technique of adding pixels) that are read out in a simultaneous and parallel manner.

In other words, according to this function, the configuration of the frame can be dynamically changed in accordance with a change of the pixel reading mode.

According to this embodiment, switching between a case (1 H-2 AD), as illustrated in FIG. 18A, in which two AD conversion processes are performed in 1 H and a case (1 H-2 AD), as illustrated in FIG. 18B, in which one AD conversion process performed in 1 H period can be dynamically performed.

According to this embodiment, a column process in which the AD conversion process is performed is configured such that two AD conversion processes are performed in 1 H (one horizontal synchronization) period in the first read-out mode RMD1 and the second read-out mode RMD2, and one AD conversion process is performed in 1 H period in the third read-out mode RMD3.

In the solid-state imaging device 100 having such a function, two AD conversion processes are performed in 1 H period in the first read-out mode RMD1 as illustrated in FIG. 19, and the frame rate at that time is relatively one with respect to the original frame rate.

In the second read-out mode RMD2, as illustrated in FIG. 19, two AD conversion processes are performed in 1 H period, and the frame rate at that time is relatively×2 with respect to the original frame rate.

In the third read-out mode RMD3, as illustrated in FIG. 19, one AD conversion process is performed in 1 H period, and the frame rate at that time is relatively×4 with respect to the original frame rate.

As above, the solid-state imaging device 100 according to this embodiment can change the configuration of the frame and the control process in accordance with a change of the read-out mode.

Thus, according to this embodiment, imaging with high precision and high efficiency that are in accordance with the read-out mode can be realized.

In addition, in this embodiment, the exposure time conditions (or the photosensitivity levels) are set as two conditions. In such a case, as a structure that is appropriate for preventing a gravity center shift, a structure is employed in which pixels facing each other in a diagonal direction have the same exposure time (or photosensitivity).

A wide dynamic range mode WDM as one of the second read-out mode in which two division pixels having the same condition are read out in a simultaneous and parallel manner can be applied to this case.

In the case of the wide dynamic range mode WDM, as described above, in a case where one pixel, for example, is divided into four division pixels (n=4), while read-out is performed at 30 fps in the first reading mode, read-out is performed at 60 fps in the wide dynamic range mode WDM.

As the interval of read-out timings, which are adjacent to each other at the time of performing consecutive read-out, a CIT (Coarse Integration Time) is 30 fps, which is the same in the first read-out mode and the wide dynamic range mode WDM.

Also in such a case, imaging with high precision and high efficiency according to a read-out mode can be realized.

<7. Addition Method in Case where Division Pixels are Divided into Two Groups according to Length of Exposure Time>

Next, addition methods in a case where n (=4) division pixels are divided into two groups in accordance with the length of the exposure time will be described.

FIGS. 20A to 20C are diagrams that illustrate the addition methods in a case where the division pixels are divided into two groups in accordance with the length of an exposure time.

FIG. 20A illustrates a case where addition is performed in the diagonal direction, and the pixel array is similar to that illustrated in FIG. 8.

FIG. 20B illustrates a case where addition is performed in the vertical direction, and a pixel array is used in which pixels having the same condition are disposed in a same column.

FIG. 20C illustrates a case where addition is performed in the horizontal direction, and a pixel array is used in which pixels having the same condition are disposed in a same row.

In FIGS. 20A to 20C, out of pixels of each color RGB, a pixel to which "L" is assigned has a long exposure time, and a pixel to which "S" is assigned has a short exposure time.

Figure 21:
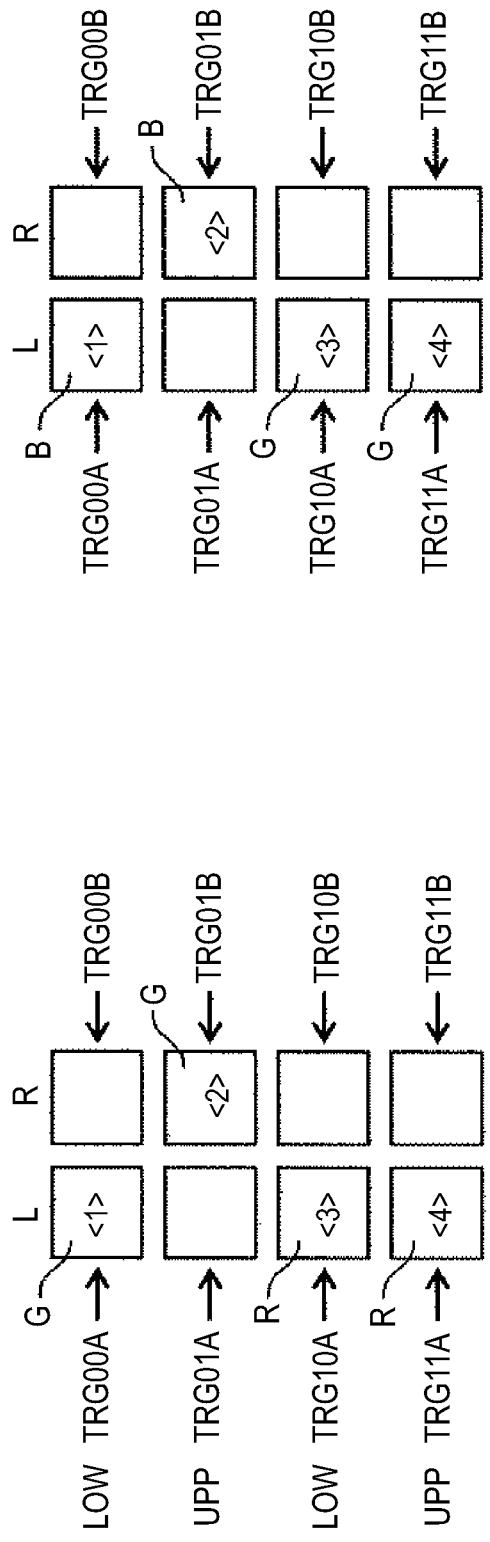
FIG. 21 is a diagram that illustrates a method of accessing pixels through a driving line in a case where addition is performed in a diagonal direction and in a case where addition is performed in the vertical direction.

FIG. 21 is a diagram that illustrates a method of accessing pixels through a driving line in a case where addition is performed in the diagonal direction and in a case where addition is performed in the vertical direction.

In FIG. 21, TRG00, TRG01, TRG10, and TRG11 represent driving lines and correspond to the driving lines L (A to H) shown in FIGS. 12, 13, and 14.

For example, in FIG. 21, in a case where read-out signals of pixels disposed in the diagonal direction, which are denoted by "<1>" and "<2">", are added, the driving lines TRG00 and TRG01 are selected so as to activate the signal LOW of column L and the signal UPP of column R in a simultaneous and parallel manner.

In addition, in FIG. 21, in a case where read-out signals of pixels disposed in the vertical direction, which are denoted by "<3>" and "<4">", are added, the driving lines TRG10 and TRG11 are selected so as to activate the signal LOW of column L and the signal UPP of column R in a simultaneous and parallel manner.

In FIGS. 22A to 22C, for easy understanding, the pixel driving timings in a case where addition is performed in the diagonal direction, in the vertical direction, and the horizontal direction are illustrated in association with FIG. 21.

<8. Configuration Example of Division Pixels>

First, for easy understanding, an example of the basic configuration of division pixels of a CMOS image sensor will be described.

Figure 23:
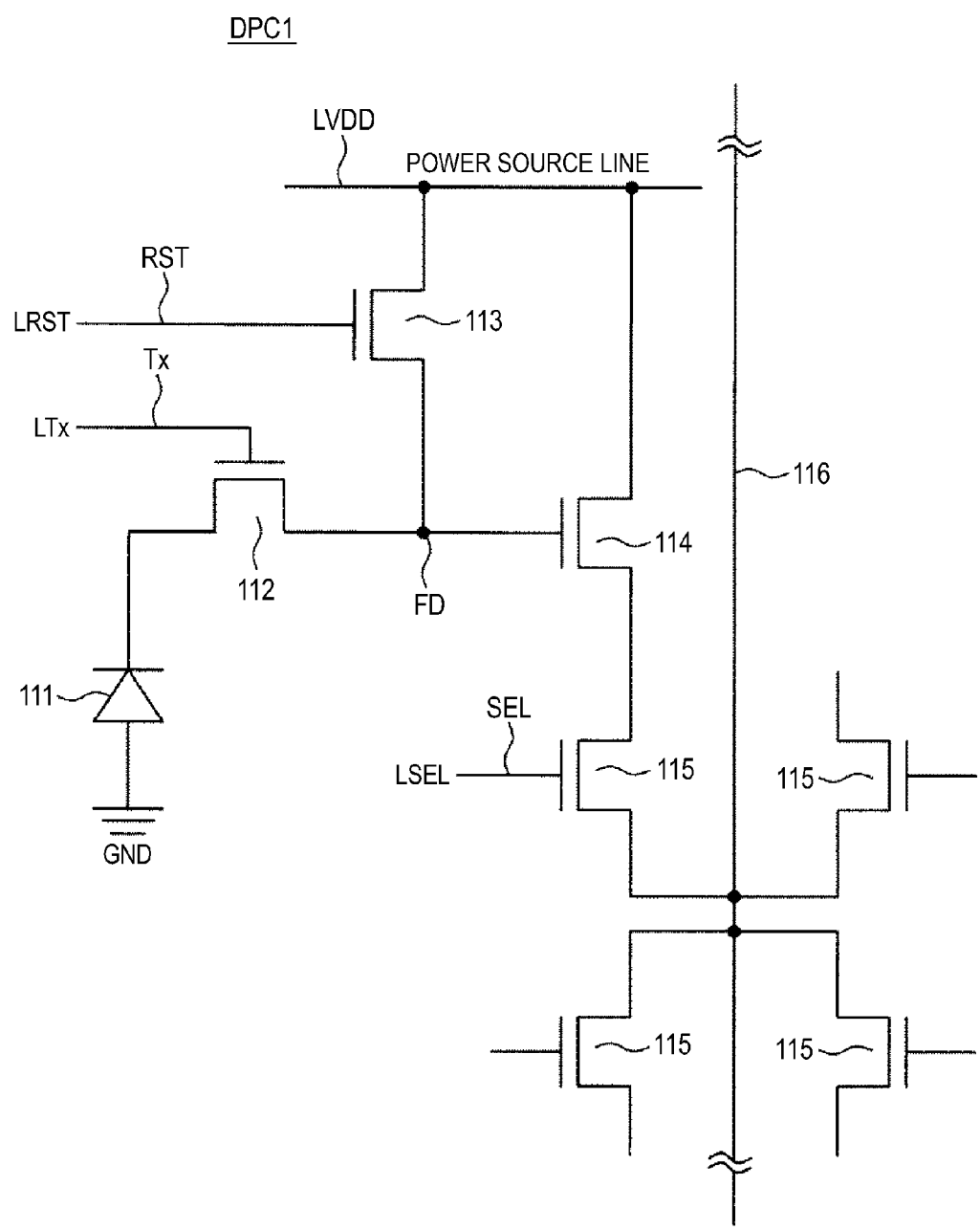
FIG. 23 is a diagram that illustrates an example of a division pixel of a CMOS image sensor that is configured by four transistors according to this embodiment.

FIG. 23 is a diagram that illustrates an example of a division pixel of a CMOS image sensor that is configured by four transistors according to this embodiment.

The division pixel DPC1 includes a photoelectric conversion device 111, that is, formed, for example, by a photodiode.

The division pixel DPC illustrated in FIG. 4 includes four transistors as active devices of a transmission transistor 112, a reset transistor 113, an amplification transistor 114 as an amplification unit, and a selection transistor 115 for each one photoelectric conversion device 111.

The photoelectric conversion device 111 performs photoelectric conversion from incident light to electric charge (here, electrons) of an amount corresponding to the intensity of the light.

The transmission transistor 112 is connected between the photoelectric conversion device 111 and the floating diffusion portion FD, and a control signal Tx is given to a gate (transmission gate) thereof through a transmission control line LTx.

Accordingly, electrons that are photoelectrically converted by the photoelectric conversion device 111 are transmitted to the floating diffusion portion FD.

The reset transistor 113 is connected between a power source line LVDD and the floating diffusion portion FD, and a control signal RST is given to a gate thereof through a reset control line LRST.

Accordingly, the electric potential of the floating diffusion portion FD is reset to the electric potential of the power source line LVDD.

The gate of the amplification transistor 114 is connected to the floating diffusion portion FD. The amplification transistor 114 is connected to a vertical signal line 116 through the selection transistor 115 and configures a source follower together with a constant current source other than the pixel unit.

Thus, a control signal (an address signal or a selection signal) SEL is given to the gate of the selection transistor 115 through a selection control line LSEL, whereby the selection transistor 115 is turned on.

When the selection transistor 115 is turned on, the amplification transistor 114 amplifies the electric potential of the floating diffusion portion FD and outputs a voltage corresponding to the electric potential to the vertical signal line 116. The voltage that is output from each pixel through the vertical signal line 116 is output to the ADC group 150 as a pixel signal read-out circuit.

For example, since the gates of the transmission transistor 112, the reset transistor 113, and the selection transistor 115 are connected in units of rows, such an operation is simultaneously performed for the division pixels DPC disposed in one row.

The reset control line LRST, the transmission control line LTx, and the selection control line LSEL that are wired in the pixel unit 110 are wired in units of rows of the pixel array as one set.

The reset control line LRST, the transmission control line LTx, and the selection control line LSEL are driven by the pixel driving circuit 102.

The above-described configuration can be directly applied to the division pixel cell according to this embodiment.

In addition, as a configuration that includes the photoelectric conversion device and the transmission transistor in each division pixel cell, a configuration may be employed in which the floating diffusion portion FD is configured so as to be shared by the division pixel cells.

In such a case, the amplification transistor as the amplification unit, the selection transistor, and the reset transistor may be formed so as to be shared.

Figure 24:
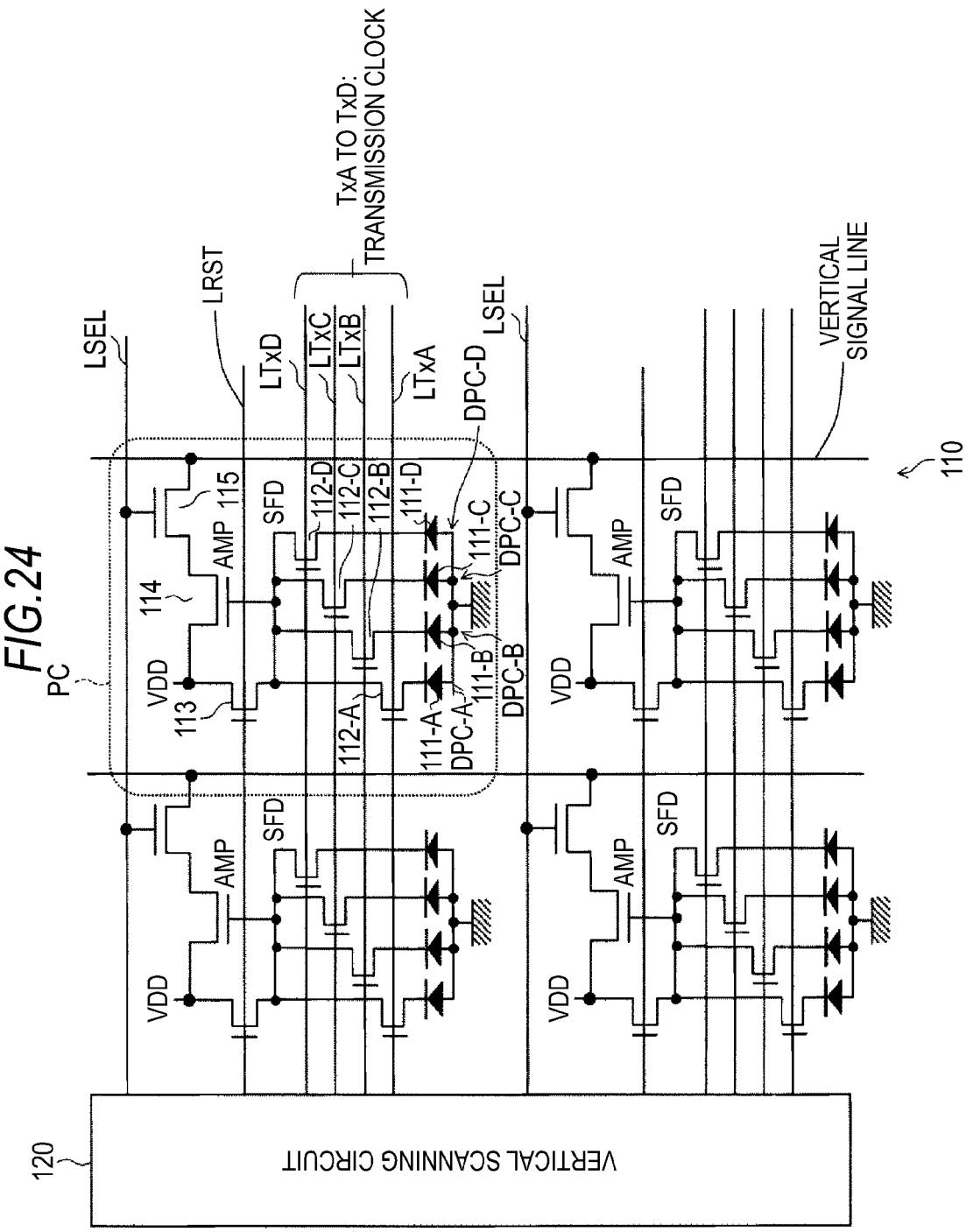
FIG. 24 is a circuit diagram that illustrates an example of a pixel in which a floating diffusion portion, an amplification transistor, a selection transistor, and a reset transistor are shared by a plurality of division pixels.

FIG. 24 is a circuit diagram that illustrates an example of a pixel in which the floating diffusion portion, the amplification transistor, the selection transistor, and the reset transistor are shared by a plurality of division pixels.

In a pixel PC that includes a plurality of division pixels DPC-A to DPC-D illustrated in FIG. 24, photoelectric conversion devices 111-A to 111-D and transmission transistors 112-A to 112-D are disposed for the division pixels DPC-A to DPC-D.

In addition, one end (for example, the drain) of each one of the transmission transistors 112-A to 112-D is connected to a common floating diffusion portion SFD.

The gate of the transmission transistor 112-A is connected to a transmission control line LTxA, and the gate of the transmission transistor 112-B is connected to a transmission control line LTxB. Similarly, the gate of the transmission transistor 112-C is connected to a transmission control line LTxC, and the gate of the transmission transistor 112-D is connected to a transmission control line LTxD.

The reset transistor 113 is connected between a power source electric potential VDD and the common floating diffusion portion SFD. The gate of the reset transistor 113 is connected to the reset control line LRST.

The amplification transistor 114 and the selection transistor 115 are connected in series between the power source electric potential VDD and the vertical signal line 116. In addition, the gate of the amplification transistor 114 is connected to the common floating diffusion portion SFD, and the gate of the selection transistor 115 is connected to the selection control line LSEL.

In such a configuration, division pixel signals that are photoelectrically converted by the photoelectric conversion devices 111A to 111D of the division pixels DPC-A to DPC-D are transmitted to the amplification transistor 114 as an amplification unit through the common floating diffusion portion SFD. Then, the division pixel signals are amplified, and the amplified division pixel signals are transmitted to the vertical signal line 116 in accordance with temporal order.

In addition, a configuration may be employed in which a photoelectric conversion device, a transmission transistor, and a reset transistor are included in each division pixel cell, and a floating diffusion portion FD is individually included in each division pixel cell.

In such a case, an amplification transistor as an amplification unit may be formed so as to be shared.

Figure 25:
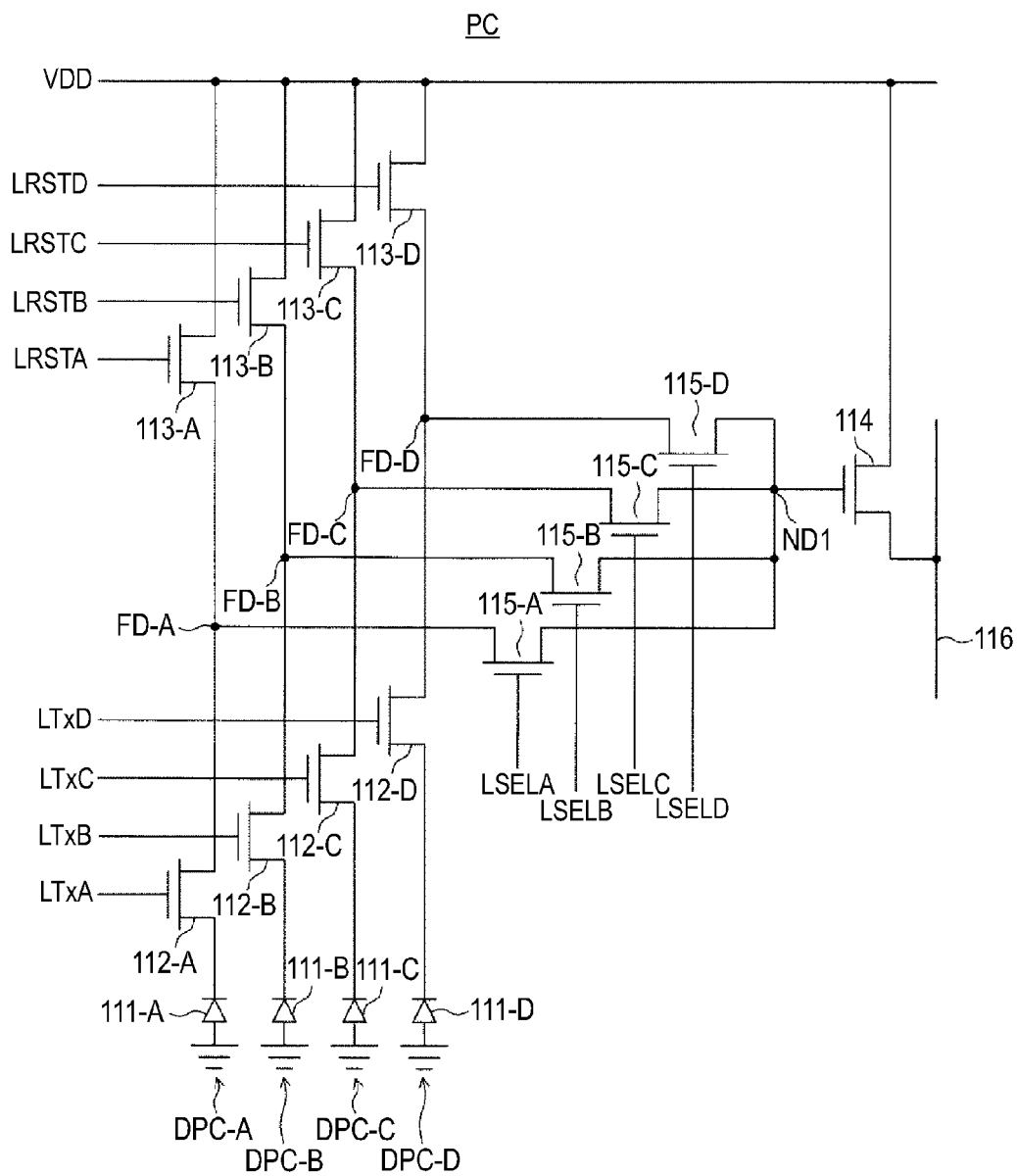
FIG. 25 is a circuit diagram that illustrates an example of a pixel in which floating diffusion portions are individually included in a plurality of division pixels, and an amplification transistor is shared therein.

FIG. 25 is a circuit diagram that illustrates an example of a pixel in which floating diffusion portions are individually included in a plurality of division pixels, and an amplification transistor is shared therein.

In the pixel PC that includes a plurality of division pixels DPC-A to DPC-D illustrated in FIG. 25, the photoelectric conversion devices 111-A to 111-D and the transmission transistors 112A to 112-D are disposed for the division pixels DPC-A to DPC-D. In addition, in the division pixels DPC-A to DPC-D, floating diffusion portions FD-A to FD-D and reset transistors 113-A to 113-D are disposed.

A selection transistor 115-A is connected between the floating diffusion portion FD-A and a node ND1, and a selection transistor 115-B is connected between the floating diffusion portion FD-B and the node ND1.

Similarly, a selection transistor 115-C is connected between the floating diffusion portion FD-C and the node ND1, and a selection transistor 115-D is connected between the floating diffusion portion FD-D and the node ND1.

The gate of the transmission transistor 112-A is connected to the transmission control line LTxA, and the gate of the transmission transistor 112-B is connected to the transmission control line LTxB. Similarly, the gate of the transmission transistor 112-C is connected to the transmission control line LTxC, and the gate of the transmission transistor 112-D is connected to the transmission control line LTxD.

The gate of the reset transistor 113-A is connected to a reset control line LRSTA, and the gate of the reset transistor 113-B is connected to a reset control line LRSTB. Similarly, the gate of the reset transistor 113-C is connected to a reset control line LRSTC, and the gate of the reset transistor 113-D is connected to a reset control line LRSTD.

The gate of the selection transistor 115-A is connected to a selection control line LSELA, and the gate of the selection transistor 115-B is connected to a selection control line LSELB. Similarly, the gate of the selection transistor 115-C is connected to a selection control line LSELC, and the gate of the selection transistor 115-D is connected to a selection control line LSELD.

The amplification transistor 114 is connected between the power source electric potential VDD and the vertical signal line 116, and the gate of the amplification transistor 114 is connected to the node ND1.

In such a configuration, the division pixel signals that are photoelectrically converted by the photoelectric conversion devices 111-A to 111-D of the division pixels DPC-A to DPC-D are transmitted to the floating diffusion portions FD-A to FD-D. The division pixel signals are transmitted to the amplification transistor 114 through the floating diffusion portions FD-A to FD-D and further through the selection transistors 115-A to 115-D. Then, the division pixel signals are amplified, and the amplified division pixel signals are transmitted to the vertical signal line 116 in accordance with temporal order.

In addition, a configuration may be employed in which a plurality of division pixels forming one pixel are divided into a plurality of groups, and a floating diffusion portion FD is shared for each divided group.

In such a case, it may be configured such that a reset transistor and a selection transistor are shared for each division group, and an amplification transistor is shared as a whole.

Figure 26:
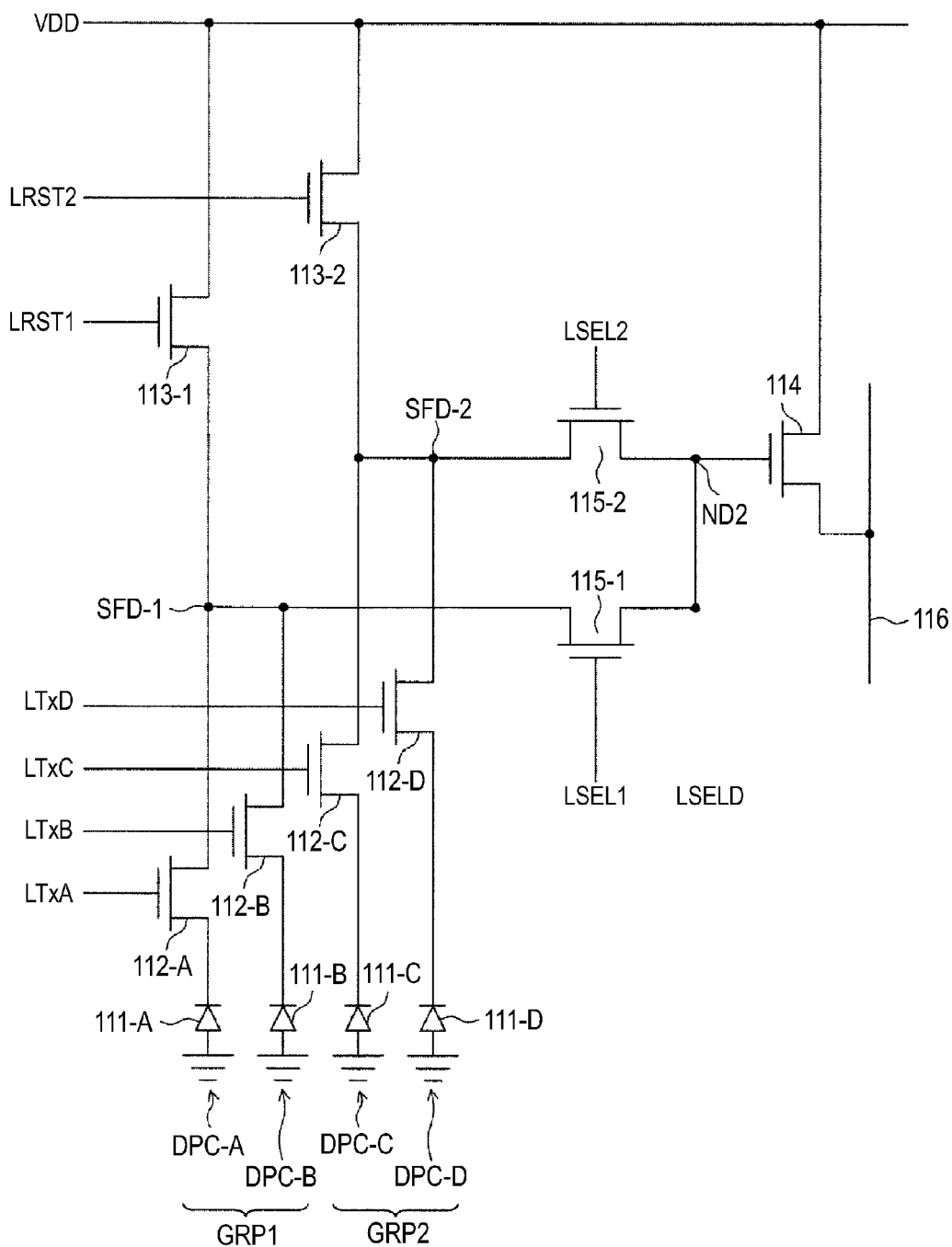
FIG. 26 is a circuit diagram that illustrates an example of a pixel in which a plurality of division pixels are grouped, a floating diffusion portion unit is shared by each group, and an amplification transistor is shared as a whole.

FIG. 26 is a circuit diagram that illustrates an example of a pixel in which a plurality of division pixels are grouped, a floating diffusion portion is shared by each group, and an amplification transistor is shared as a whole.

In this example, four division pixels DPC-A, DPC-B, DPC-C, and DPC-D are divided into two groups.

More specifically, the division pixel DPC-A and the division pixel DPC-B are grouped into a first group GRP1, and the division pixel DPC-C and the division pixel DPC-D are grouped into a second group GRP2.

In the division pixels DPC-A and DPC-B of the first group GRP1 illustrated in FIG. 26, photoelectric conversion devices 111-A and 111-B and transmission transistors 112-A and 112-B are disposed.

In addition, one end (for example, the drain) of each one of the transmission transistors 112-A and 112B is connected to a common floating diffusion portion SFD1.

The gate of the transmission transistor 112-A is connected to a transmission control line LTxA, and the gate of the transmission transistor 112-B is connected to a transmission control line LTxB.

In the division pixels DPC-C and DPC-D of the second group GRP2 illustrated in FIG. 26, photoelectric conversion devices 111-C and 111-D and transmission transistors 112-C and 112-D are disposed.

In addition, one end (for example, the drain) of each one of the transmission transistors 112-C and 112D is connected to a common floating diffusion portion SFD2.

The gate of the transmission transistor 112-C is connected to a transmission control line LTxC, and the gate of the transmission transistor 112-D is connected to a transmission control line LTxD.

A reset transistor 113-1 is connected between the power source electric potential VDD and a common floating diffusion portion SFD1. The gate of the reset transistor 113-1 is connected to a reset control line LRST1.

A reset transistor 113-2 is connected between the power source electric potential VDD and a common floating diffusion portion SFD2. The gate of the reset transistor 113-2 is connected to a reset control line LRST2.

A selection transistor 115-1 is connected between the common floating diffusion portion SFD1 and a node ND2, and a selection transistor 115-2 is connected between the common floating diffusion portion SFD2 and the node ND2.

The gate of the selection transistor 115-1 is connected to a selection control line LSEL1, and the gate of the selection transistor 115-2 is connected to a selection control line LSEL2.

The amplification transistor 114 is connected between the power source electric potential VDD and the vertical signal line 116, and the gate of the amplification transistor 114 is connected to the node ND2.

In such a configuration, the division pixel signals that are photoelectrically converted by the photoelectric conversion devices 111-A to 111-D of the division pixels DPC-A to DPC-D are transmitted to the common floating diffusion portions SFD1 and SFD2. The division pixel signals are transmitted to the amplification transistor 114 through the floating diffusion portions SFD1 and SFD2 and further through the selection transistors 115-1 and 115-2. Then, the division pixel signals are amplified, and the amplified division pixel signals are transmitted to the vertical signal line 116 in accordance with temporal order.

As above, there are various methods of dividing one pixel into a plurality of areas within the plane of the pixel, and the methods can be largely divided into a common floating diffusion (sharing four pixels) type (hereinafter, referred to as a common FD type) and an individual floating diffusion type (hereinafter, referred to as an individual FD type).

FIGS. 27A to 27D are diagrams that illustrate methods of dividing a pixel into a plurality of areas within the plane of one pixel.

Figure 27A:
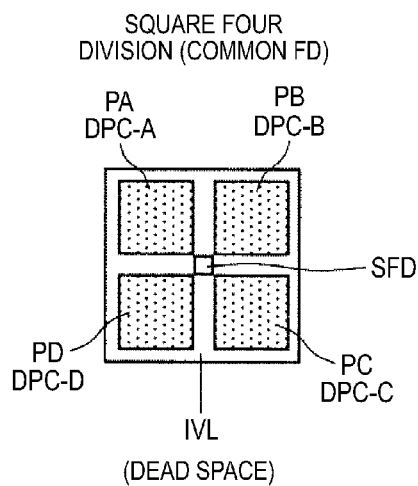
FIGS. 27A to 27D are diagrams that illustrate methods of dividing a pixel into a plurality of areas within the plane of one pixel.
Figure 27B:
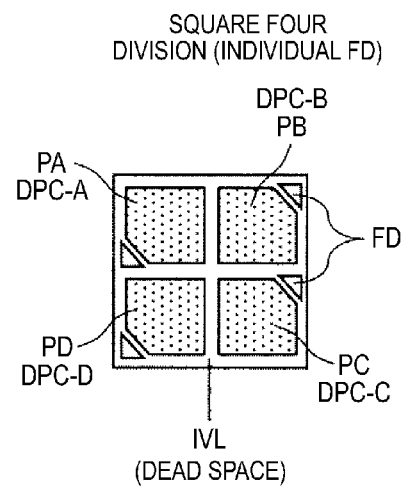
Figure 27C:
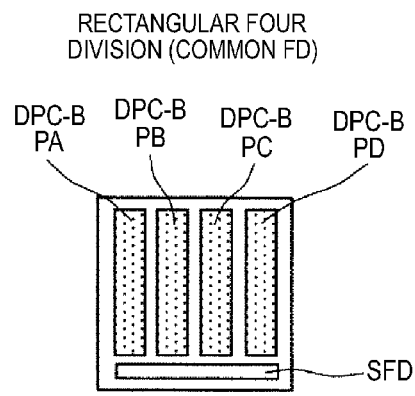
Figure 27D:
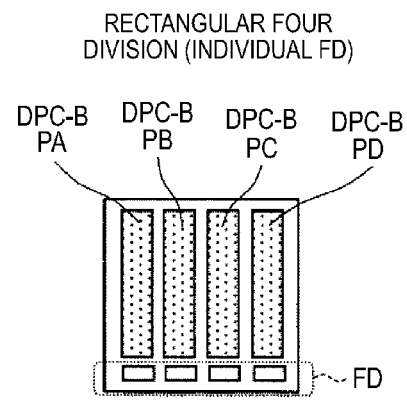

FIG. 27A illustrates an example in which a pixel is divided into four areas in square shapes in accordance with the common FD type, and FIG. 27B illustrates an example in which a pixel is divided into four areas in square shapes in accordance with the individual FD type. In addition, FIG. 27C illustrates an example in which a pixel is divided into four areas in strip shapes in accordance with the common FD type, and FIG. 27D illustrates an example in which a pixel is divided into four areas in strip shapes in accordance with the individual FD type.

In addition, although detailed description is will not be presented here, a photosensitive layer of which the sensitivity changes in a direction perpendicular to the plane or stacking semiconductor layers (PN junction) may be referred to as pixel division in a broad sense.

A change in the sensitivity of the division pixel can be realized by using a method such as a method in which the aperture ratio of the device changes, a method in which optical filter characteristics are implemented in an insulating film on a photosensitive area, or a method in which the impurity density of the substrate changes.

In FIGS. 27A to 27D, specifically, examples in which one pixel is divided into four areas are illustrated, and, in addition to divided photosensitive regions PA, PB, PC, and PD, there is an ineffective area (dead space) IVL that does not directly contribute to the exposure.

The area IVL is a space (channel stop) used for electrically separating division cells such that the division cells do not interfere with each other due to a leak of pixel electric charge from the division cells, and a wiring used for signal processing is disposed as is necessary.

In addition, in the description presented above, the division pixel adding signal processing has been described for the column-parallel ADC-mounted solid-state imaging device (CMOS image sensor) as an example.

As the division pixel adding signal processing of a so-called column AD conversion-type CMOS image sensor, for example, the following two methods may be used.

Figure 28A:
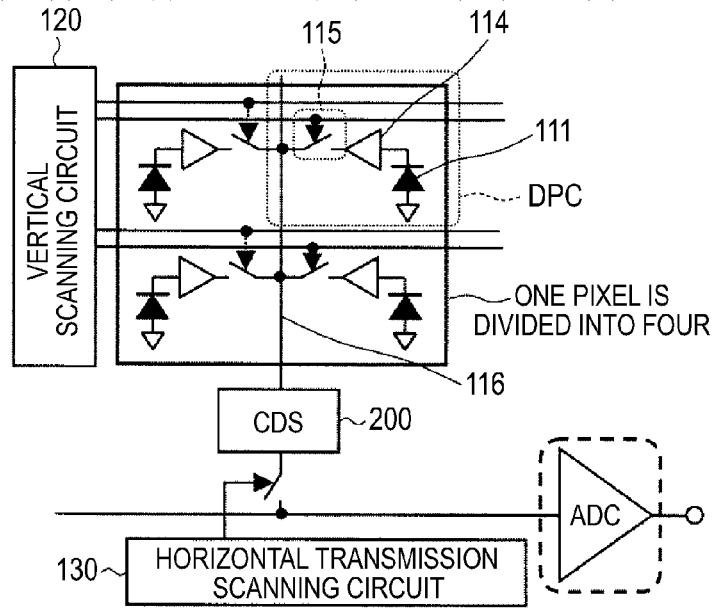
FIGS. 28A and 28B are schematic diagrams that illustrate configuration examples of a column AD conversion-type CMOS image sensor circuit relating to the addition of division pixels.

FIG. 28A is a schematic diagram that illustrates a configuration example of the column AD conversion-type CMOS image sensor circuit relating to the addition of division pixels.

As illustrated in FIG. 28A, one pixel disposed under a filter of a same color is divided into four division pixels, the photosensitivity and the accumulation time are changed for a plurality of pixels corresponding to the diagonal direction of the division pixels, and pixel signals are sequentially read out so as to be output to the same signal line through the common floating diffusion FD. Then, the noise is processed by a CDS circuit 200 that is disposed for each column, and the A/D converter is operated for each row outside the column, as an example.

Figure 28B:
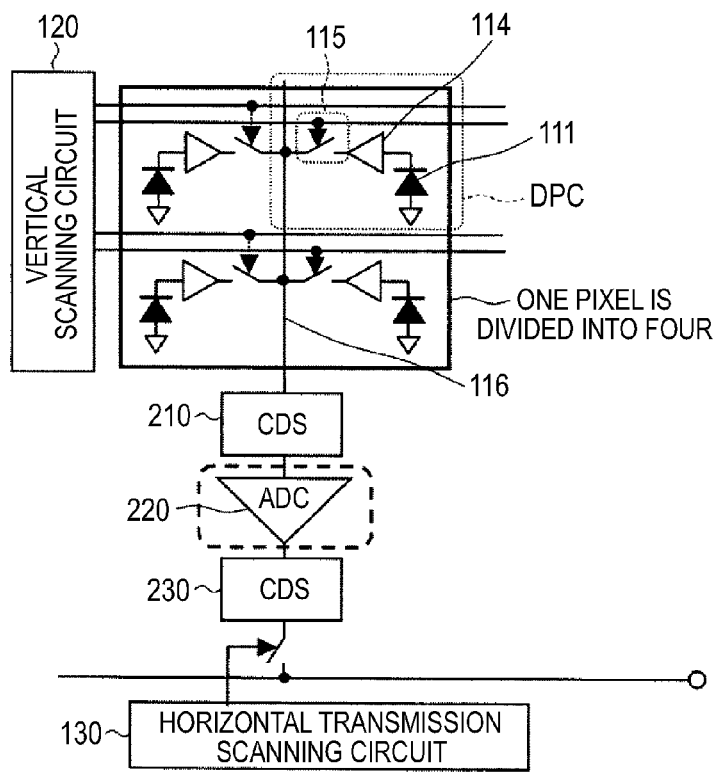

FIG. 28B is a schematic diagram that illustrates another configuration example of the column AD conversion-type CMOS image sensor circuit relating to the addition of division pixels.

As illustrated in FIG. 28B, one pixel disposed under a filter of a same color is divided into four division pixels, and the photosensitivity and the accumulation time are changed for a plurality of pixels corresponding to the diagonal direction of the division pixels. Then, pixel signals are sequentially read out so as to be output to the same signal line through the common floating diffusion FD, and the noise is processed for the first time by a CDS circuit 210 that is disposed for each column.

Thereafter, the analog signal is converted into a digital signal by the A/D converter 220 that is disposed for each column, the noise is processed for the second time by a CDS circuit 230 that is disposed further for each column, and a digital noise generated during the A/D conversion is removed, as an example.

In addition, in the description presented above, although a case has been described as an example in which the present technology is applied to a CMOS image sensor, the present technology can be applied also to a CCD sensor.

FIG. 29 is a diagram that illustrates a configuration example of a solid-state imaging device corresponding to a CCD sensor according to an embodiment of the present technology.

The solid-state imaging device 300 illustrated in FIG. 29 is arranged in a matrix pattern in the row (vertical direction) and the column (horizontal direction) and includes a plurality sensor units (photoelectric conversion devices) 311 that converts incident light into a signal electric charge of an amount corresponding to the intensity of the light and stores the signal electric charge.

The solid-state imaging device 300 includes a plurality of vertical transmission registers 312 that are disposed for each vertical row of the sensor units 311 and vertically transmit signal electric charge that is read out from each sensor unit 311 through a read-out gate unit (not illustrated in the figure). An imaging area 313 is configured by the sensor units and the vertical transmission registers 312.

A Bayer array is employed for the sensor unit 311, and each pixel is divided into division pixels DPC that are a plurality of areas (for example, four areas of each two sensitivity levels) having mutually different sensitivity levels.

The vertical transmission register 312 is driven for transmission, for example, in accordance with a three or four-phase vertical transmission pulse and sequentially transmits parts of a signal charge as a division pixel signal, which is readout from each sensor unit 311, each corresponding to one scanning line (one line) in the vertical direction in a part of a horizontal blanking interval.

On a lower side of the imaging area 313 in the figure, a horizontal transmission register 314 is disposed. Signal electric charges as division pixel signals each corresponding to one line are sequentially transmitted from a plurality of the vertical transmission registers 312 to the horizontal transmission register 314.

The horizontal transmission register 314 is driven for transmission, for example, in accordance with a three or four-phase horizontal transmission pulse and sequentially transmits the signal charges corresponding to one line, which have been transmitted from a plurality of vertical transmission registers 12, in the horizontal direction in a horizontal scanning interval after the horizontal blanking interval.

In addition, an electric charge detecting unit 315, for example, having a floating diffusion amplifier configuration is disposed in an end portion of the horizontal transmission register 314 that is located on the transmission destination side.

This electric charge detecting unit 315 includes a floating diffusion unit FD that accumulates signal electric charges that are supplied from the horizontal transmission register 314 through a horizontal output gate unit. The electric charge detecting unit 315, although not illustrated in the figure, includes a reset drain (RD) that discharges signal electric charge and a reset gate (RG) that is disposed between the floating diffusion unit FD and the reset drain.

In this electric charge detecting unit 315, a predetermined reset drain voltage is applied to the reset drain, and a reset pulse is applied to the reset gate in a signal charge detection period.

The signal electric charge that is accumulated in the floating diffusion unit FD is converted into a signal voltage and is derived to a CSD circuit 320 as a CCD output signal CCDout through an output circuit 316. Then, in the ADC 330, AD conversion and the addition process of the division pixel signals are performed.

As described above, according to this embodiment, basically, in a case where n division pixels are formed, read-out is performed at a speed that is n times the normal speed in the third read-out mode RMD3, and read-out is performed at a speed that is n/2 times the normal speed in the second read-out mode RMD2.

In other words, in the third read-out mode RMD3, the frame length is the same as that of the first read-out mode RMD1, and only the speed is set to four times the normal speed. In addition, in the second read-out mode RMD2, only the speed is set to twice the normal speed, whereby the activation ratio of the circuit can decrease.

As above, according to this embodiment, the activation ratio of the circuit can decrease, whereby high-speed shutter imaging can be realized with low power consumption.

According to this embodiment, the configuration of the frame and the control process can be changed in accordance with a change of the read-out mode.

Therefore, according to this embodiment, imaging with high precision and high efficiency according to a read-out mode can be realized.

In addition, according to this embodiment, in order to prevent the gravity center shift within one pixel, the exposure time conditions (or the photosensitivity levels) are set as two conditions, and a structure is employed in which pixels facing each other in the diagonal direction has a same exposure time.

Then, the pixel signal is transmitted to the vertical signal line and is added by the AD conversion unit that is disposed in the column unit.

In addition, according to this embodiment, in order to maximize the S/N, when the signal is returned to be linear, a final output is not acquired through a direct calculation, but an optimal magnification is calculated once based on the raw output value, and the final output is configured to be calculated by multiplying the raw output value by the magnification.

Therefore, according to this embodiment, the following advantages can be acquired.

The gravity center shift can be prevented, and the S/N can be maximized.

A pixel of a solid-state imaging device that has a wide dynamic range, has high sensitivity for low light intensity, and has high-luminance information compression characteristics can be realized.

In addition, compared to digital addition in the related art, an external memory is not necessary.

Furthermore, there is no unevenness in break points that are points at which one pixel as an addition target like that in an analog addition process saturates.

The S/N is improved at the break point (a point at which one pixel as an addition target saturates), and the S/N of a level that is equal to or higher than that of a no-division pixel can be attained for a middle or higher luminance level.

In addition, the structure of divided pixels can be realized without increasing the number of processes to that degree.

Furthermore, the embodiment of the present technology may be configured to switch to read-out for acquiring a high-resolution image in which each division pixel is independently read out.

The solid-state imaging device having such advantages can be applied as an imaging device of a digital camera or a video camera.

<9. Configuration Example of Camera System>

Figure 30:
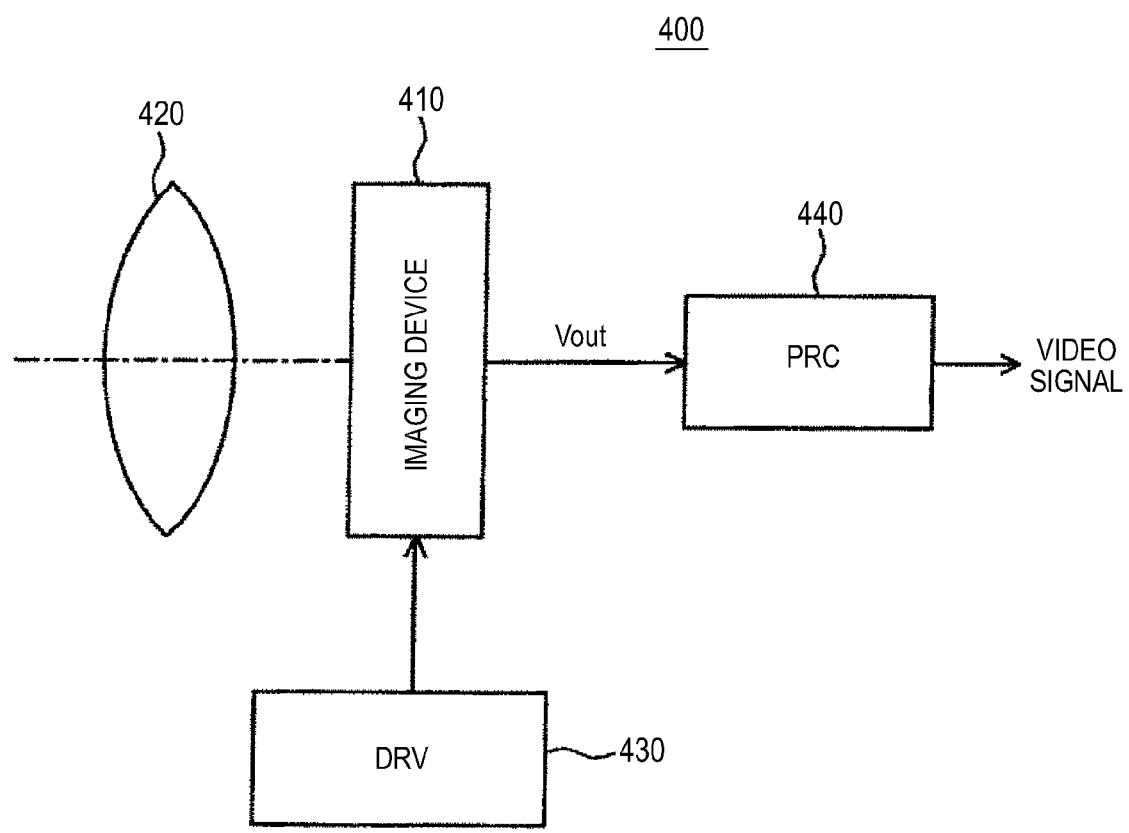
FIG. 30 is a diagram that illustrates an example of the configuration of a camera system to which a solid-state imaging device according to an embodiment of the present technology is applied.

FIG. 30 is a diagram that illustrates an example of the configuration of a camera system to which the solid-state imaging device according to this embodiment of the present technology is applied.

The camera system 400, as illustrated in FIG. 30, includes an imaging device 410 to which the CMOS image sensor (solid-state imaging device) 100 or 300 according to this embodiment can be applied.

The camera system 400 includes an optical system that guides incident light to a pixel region of the imaging device 410 (forms a subject image), for example, a lens 420 that condenses incident light (image light) on an imaging surface.

The camera system 400 includes a driving circuit (DRV) 430 that drives the imaging device 410 and a signal processing circuit (PRC) 440 that processes an output signal of the imaging device 410.

The driving circuit 430 includes a timing generator (not illustrated in the figure) that generate various timing signals including a start pulse and a clock pulse that are used for driving circuits inside the imaging device 410 and drives the imaging device 410 using a predetermined timing signal.

In addition, the signal processing circuit 440 performs signal processing such as CDS for an output signal of the imaging device 410.

The image signal processed by the signal processing circuit 440 is stored in a recording medium such as a memory. The image information that is recorded in the recording medium is hard-copied by a printer or the like. In addition, the image signal processed by the signal processing circuit 440 is projected on a monitor that is configured by a liquid crystal display or the like as a moving image.

As described above, by mounting the imaging apparatus 100 that is premised as the imaging device 410 in an imaging device such as a digital still camera, a camera with low power consumption and high precision can be realized.

Furthermore, the present technology may be implemented as the following configurations.

(1) A solid-state imaging device including: a pixel unit in which a plurality of pixels are arranged in a matrix pattern; and a pixel signal read-out unit that includes an AD conversion unit that performs analog-to-digital (AD) conversion of a pixel signal that is read out from the pixel unit, wherein each pixel included in the pixel unit includes a plurality of division pixels that are divided into regions in which photosensitivity levels or electric charge accumulating amounts are different from one another, the pixel signal reading unit includes a normal read-out mode in which signals are sequentially read out for each row and a multiple read-out mode in which signals are read out from a plurality of rows in a simultaneous and parallel manner as read-out modes in which division pixel signals of each division pixel of the pixel are read out, performs read-out at a speed corresponding to the times of the number of the pixels that are read out in a simultaneous and parallel manner, and includes a function of changing a configuration of a frame in accordance with a change of the read-out mode, and the AD conversion unit acquires a pixel signal of one pixel by adding the division pixel signals read out in accordance with the read-out mode while performing AD conversion for the division pixel signals.

(2) The solid-state imaging device according to (1) described above, wherein n division pixels are formed, wherein the pixel signal read-out unit performs read-out at a speed that is n times a speed of the normal read-out mode in a case where n divided pixels are read out in a simultaneous and parallel manner in the multiple read-out mode, and wherein the number of AD conversion processes performed in one processing period is smaller in the multiple read-out mode than in the normal read-out mode.

(3) The solid-state imaging device according to (1) or (2) described above, wherein n (here, n is an integer that is equal to or greater than four) division pixels are formed, the n division pixels are classified into M (here, M is an integer that is equal to or greater than two) groups, and photosensitivity conditions or exposure time conditions of the division pixels included in each group are set to be the same, wherein the pixel signal read-out unit performs read-out at a speed that is (n/M) times a speed of the normal read-out mode in a case where a plurality of division pixels included in the same group out of the n divided pixels are read out in a simultaneous and parallel manner in the multiple read-out mode, and wherein the number of the AD conversion processes performed in one processing period in the normal read-out mode is the same as that in the multiple read-out mode.

(4) The solid-state imaging device according to any one of (1) to (3) described above, wherein n division pixels are formed, wherein the pixel signal read-out unit includes a read-out function of performing read-out at a speed corresponding to the times of the number of pixels that are read out in a simultaneous and parallel manner in a period of a frame that is one/multiples of the frame of the normal read-out mode in the multiple read-out mode, and wherein, in the multiple read-out mode, read-out is performed at a speed that is n times a speed of the normal read-out mode in a period of (1/n) frame of the frame of the normal read-out mode in a case where the n divided pixels are read out in a simultaneous and parallel manner.

(5) The solid-state imaging device according to any one of (1) to (4) described above, wherein n (here, n is an integer that is equal to or greater than four) division pixels are formed, the n division pixels are classified into M (here, M is an integer that is equal to or greater than two) groups, and photosensitivity conditions or exposure time conditions of the division pixels included in each group are set to be the same, wherein the pixel signal read-out unit includes a function of performing read-out at a speed corresponding to the times of the number of the pixels that are read out in a simultaneous and parallel manner in a period of a frame of one/multiples of the frame of the normal read-out mode in the multiple read-out mode, and wherein read-out is performed at a speed that is (n/M) times the speed of the normal read-out mode in a period of (M/n) frame of the frame of the normal read-out mode in a case where a plurality of division pixels included in a same group out of the n division pixels are read out in a simultaneous and parallel manner in the multiple read-out mode.

(6) The solid-state imaging device according to any one of (1) to (5) described above, wherein a plurality of photosensitivity conditions or exposure time conditions are set for the plurality of division pixels, and the photosensitivity conditions or the exposure time conditions of division pixels that are disposed so as to face each other in a diagonal direction are set to be the same.

(7) A solid-state imaging device including: a pixel unit in which a plurality of pixels are arranged in a matrix pattern; and a pixel signal read-out unit that includes an AD conversion unit that performs analog-to-digital (AD) conversion of a pixel signal that is read out from the pixel unit, wherein one pixel included in the pixel unit is formed as a plurality of division pixels that are divided into regions in which photosensitivity levels or electric charge accumulating amounts are different from one another, wherein the pixel signal reading unit includes a normal read-out mode in which signals are sequentially read out for each row and a multiple read-out mode in which signals are read out from a plurality of rows in a simultaneous and parallel manner as read-out modes in which division pixel signals of each division pixel of the pixel are read out, performs read-out at a speed corresponding to the times of the number of the pixels that are read out in a simultaneous and parallel manner in the multiple read-out mode, and includes a function of changing a configuration of a frame in accordance with a change of the read-out mode, and, wherein the AD conversion unit acquires a pixel signal of one pixel by adding the division pixel signals read out in accordance with the read-out mode while performing AD conversion for the division pixel signals.

(8) The solid-state imaging device according to (7) described above, wherein n division pixels are formed, wherein the pixel signal read-out unit performs read-out at a speed that is n times a speed of the normal read-out mode in a case where n divided pixels are read out in a simultaneous and parallel manner in the multiple read-out mode, and wherein the number of AD conversion processes performed in one processing period is smaller in the multiple read-out mode than in the normal read-out mode.

(9) The solid-state imaging device according to (7) or (8) described above, wherein n (here, n is an integer that is equal to or greater than four) division pixels are formed, the n division pixels are classified into M (here, M is an integer that is equal to or greater than two) groups, and photosensitivity conditions or exposure time conditions of the division pixels included in each group are set to be the same, wherein the pixel signal read-out unit performs read-out at a speed that is (n/M) times a speed of the normal read-out mode in a case where a plurality of division pixels included in the same group out of the n divided pixels are read out in a simultaneous and parallel manner in the multiple read-out mode, and wherein the number of the AD conversion processes performed in one processing period in the normal read-out mode is the same as that in the multiple read-out mode.

(10) The solid-state imaging device according to any one of (7) to (9) described above, wherein n division pixels are formed, wherein the pixel signal read-out unit includes a read-out function of performing read-out at a speed corresponding to the times of the number of pixels that are read out in a simultaneous and parallel manner in a period of a frame that is one/multiples of the frame of the normal read-out mode in the multiple read-out mode, and wherein, in the multiple read-out mode, read-out is performed at a speed that is n times a speed of the normal read-out mode in a period of (1/n) frame of the frame of the normal read-out mode in a case where the n divided pixels are read out in a simultaneous and parallel manner.

(11) The solid-state imaging device according to anyone of (7) to (10) described above, wherein n (here, n is an integer that is equal to or greater than four) division pixels are formed, the n division pixels are classified into M (here, M is an integer that is equal to or greater than two) groups, and photosensitivity conditions or exposure time conditions of the division pixels included in each group are set to be the same, wherein the pixel signal read-out unit includes a function of performing read-out at a speed corresponding to the times of the number of the pixels that are read out in a simultaneous and parallel manner in a period of a frame of one/multiples of the frame of the normal read-out mode in the multiple read-out mode, and wherein read-out is performed at a speed corresponding to (n/M) times the speed of the normal read-out mode in a period of (M/n) frame of the frame of the normal read-out mode in a case where a plurality of division pixels included in a same group out of the n division pixels are read out in a simultaneous and parallel manner in the multiple read-out mode.

(12) The solid-state imaging device according to anyone of (7) to (11) described above, wherein a plurality of photosensitivity conditions or exposure time conditions are set for the plurality of division pixels, and the photosensitivity conditions or the exposure time conditions of division pixels that are disposed so as to face each other in a diagonal direction are set to be the same.

(13) A camera system including: a solid-state imaging device; and an optical system that forms a subject image in the solid-state imaging device, wherein the solid-state imaging device includes a pixel unit in which a plurality of pixels are arranged in a matrix pattern and a pixel signal read-out unit that includes an AD conversion unit that performs analog-to-digital (AD) conversion of a pixel signal that is read out from the pixel unit, wherein each pixel included in the pixel unit includes a plurality of division pixels that are divided into regions in which photosensitivity levels or electric charge accumulating amounts are different from one another, wherein the pixel signal reading unit includes a normal read-out mode in which signals are sequentially read out for each row and a multiple read-out mode in which signals are read out from a plurality of rows in a simultaneous and parallel manner as read-out modes in which division pixel signals of each division pixel of the pixel are read out, performs read-out at a speed corresponding to the times of the number of the pixels that are read out in a simultaneous and parallel manner, and includes a function of changing a configuration of a frame in accordance with a change of the read-out mode, and wherein the AD conversion unit acquires a pixel signal of one pixel by adding the division pixel signals read out in accordance with the read-out mode while performing AD conversion for the division pixel signals.

(14) A camera system including: a solid-state imaging device; and an optical system that forms a subject image in the solid-state imaging device, wherein the solid-state imaging device includes a pixel unit in which a plurality of pixels are arranged in a matrix pattern and a pixel signal read-out unit that includes an AD conversion unit that performs analog-to-digital (AD) conversion of a pixel signal that is read out from the pixel unit, wherein one pixel included in the pixel unit is formed as a plurality of division pixels that are divided into regions in which photosensitivity levels or electric charge accumulating amounts are different from one another, wherein the pixel signal reading unit includes a normal read-out mode in which signals are sequentially read out for each row and a multiple read-out mode in which signals are read out from a plurality of rows in a simultaneous and parallel manner as read-out modes in which division pixel signals of each division pixel of the pixel are read out, performs read-out at a speed corresponding to the times of the number of the pixels that are read out in a simultaneous and parallel manner in the multiple read-out mode, and includes a function of changing a configuration of a frame in accordance with a change of the read-out mode, and wherein the AD conversion unit acquires a pixel signal of one pixel by adding the division pixel signals read out in accordance with the read-out mode while performing AD conversion for the division pixel signals.

The present disclosure contains subject matter related to that disclosed in Japanese Priority Patent Application JP 2011-192114 filed in the Japan Patent Office on Sep. 2, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
 a pixel unit in which a plurality of groups of pixels are arranged in a matrix pattern, wherein n pixels are formed in each group of pixels, n is an integer greater than or equal to four, each group of pixels includes two or more pixels that share a floating diffusion portion, n pixels are classified into M groups having the same photosensitivity conditions and/or exposure time conditions, and M is an integer that is equal to or greater than two; and
 a driving unit that controls two or more read-out modes, changes a configuration of a frame in accordance with a change of the read-out mode, and performs read-out at a speed that is (n/M) times a speed of a normal read-out mode of the two or more read-out modes in a predetermined period of (M/n) frame,
 wherein at least one of the read-out modes simultaneously reads the pixel signals from two or more pixels in each group and adds the pixel signals on the floating diffusion portion.

2. The solid-state imaging device according to claim 1, wherein the driving unit performs read-out at a speed that is n times a speed of a normal read-out mode of the two or more read-out modes in a predetermined period of (1/n) frame.

3. The solid-state imaging device according to claim 1, wherein the driving unit includes a number of analog to digital (AD) conversion processes and performs read-out at a speed that is n times a speed of the normal read-out mode of the two or more read-out modes, and wherein the number of AD conversion processes performed in one processing period is smaller in the other of the two or more read-out modes than in the normal read-out mode.

4. The solid-state imaging device according to claim 1, wherein driving unit includes a number of analog to digital (AD) conversion processes and
the number of AD conversion processes performed in one processing period in the normal read-out mode is the same as that in the other of the two or more read-out modes.

5. The solid-state imaging device according to claim 1, wherein a plurality of photosensitivity conditions and/or exposure time conditions are set for the plurality of pixels, and the photosensitivity conditions or the exposure time conditions of pixels that are disposed so as to face each other in a diagonal direction are set to be the same.

6. The solid-state imaging device according to claim 1, wherein each of the pixels includes a photoelectric conversion portion to generate a charge according to an incident light.

7. The solid-state imaging device according to claim 6, wherein each of the pixels includes a transistor portion to transfer the charge from the photoelectric conversion portion to the floating diffusion portion.

8. The solid-state imaging device according to claim 1, wherein each of the groups includes two or more pixels that share a transistor portion to reset charge stored in the floating diffusion portion.

9. The solid-state imaging device according to claim 1, wherein each of the groups includes two or more pixels that share a transistor portion to convert charge stored in the floating diffusion portion to the pixel signal.

10. The solid-state imaging device according to claim 1, wherein each of the groups includes four pixels, and wherein for any one group each of the four pixels is sensitive to the same color.

11. The solid-state imaging device according to claim 1, wherein each of the groups includes four pixels that have two small groups, wherein each of the small groups include two pixels that are disposed so as to face each other in a diagonal direction.

12. The solid-state imaging device according to claim 11, wherein one of the two small groups has a different exposure period or a different photosensitivity condition from another of the two small groups.

13. The solid-state imaging device according to claim 1, wherein each of the groups includes four pixels that have a different exposure period or a different photosensitivity condition respectively.

14. A camera system comprising:
a solid-state imaging device;
an optical system that forms a subject image in the solid-state imaging device,
wherein the solid-state imaging device includes a pixel unit in which a plurality of groups of pixels are arranged in a matrix pattern, wherein n pixels are formed in each group of pixels, n is an integer greater than or equal to four, each group of pixels includes two or more pixels that share a floating diffusion portion, n pixels are classified into M groups having the same photosensitivity conditions and/or exposure time conditions, and M is an integer that is equal to or greater than two; and
a driving unit that controls two or more read-out modes, changes a configuration of a frame in accordance with a change of the read-out mode, and performs read-out at a speed that is (n/M) times a speed of a normal read-out mode of the two or more read-out modes in a predetermined period of (M/n) frame,
wherein at least one of the read-out modes simultaneously reads the pixel signals from two or more pixels in each group and adds the pixel signals on the flowing diffusion portion.

15. The camera system of claim 14, wherein the driving unit performs read-out at a speed that is n times a speed of a normal read-out mode of the two or more read-out modes in a predetermined period of (1/n) frame.

16. The camera system of claim 14,
wherein the driving unit includes a number of analog to digital (AD) conversion processes and performs read-out at a speed that is n times a speed of a normal read-out mode of the two or more read-out modes, and
wherein the number of AD conversion processes performed in one processing period is smaller in the other of the two or more read-out modes than in the normal read-out mode.

17. The camera system of claim 14, wherein the driving unit includes a number of analog to digital (AD) conversion processes and
the number of the AD conversion processes performed in one processing period in the normal read-out mode is the same as that in the other of the two or more read-out modes.

18. The camera system of claim 14, wherein a plurality of photosensitivity conditions and/or exposure time conditions are set for the plurality of pixels, and the photosensitivity conditions or the exposure time conditions of pixels that are disposed so as to face each other in a diagonal direction are set to be the same.

19. The camera system of claim 14, wherein each of the pixels includes a photoelectric conversion portion to generate a charge according to an incident light.

20. The camera system of claim 19, wherein each of the pixels includes a transistor portion to transfer the charge from the photoelectric conversion portion to the floating diffusion portion.

21. The camera system of claim 14, wherein each of the groups includes two or more pixels that share a transistor portion to reset charge stored in the floating diffusion portion.

22. The camera system of claim 14, wherein each of the groups includes two or more pixels that share a transistor portion to convert charge stored in the floating diffusion portion to the pixel signal.

23. The camera system of claim 14, wherein each of the groups includes four pixels, and wherein for any one group each of the four pixels is sensitive to the same color.

24. The camera system of claim 14, wherein each of the groups includes four pixels that have two small groups, wherein each of the small groups include two pixels that are disposed so as to face each other in a diagonal direction.

25. The camera system of claim 14, wherein one of the two small groups has a different exposure period or a different photosensitivity condition from another of the two small groups.

26. The camera system of claim 14, wherein each of the groups includes four pixels that have a different exposure period or a different photosensitivity condition respectively.

27. A camera system comprising:
a solid-state imaging device; and
an optical system that forms a subject image in the solid-state imaging device,
wherein the solid-state imaging device includes a pixel unit in which a plurality of groups of pixels are arranged in a matrix pattern, wherein n pixels are formed in each group of pixels, n is an integer greater than or equal to four, each group of pixels includes two or more pixels that share a floating diffusion portion, n pixels are classified into M groups having the same photosensitivity conditions and/or exposure time conditions, and M is an integer that is equal to or greater than two; and a driving unit configured to connect to the pixel unit to control read out of a pixel signal from each of the pixels, control two or more read-out modes, change a configuration of a frame in accordance with a change of the read-out mode, and perform read-out at a speed that is (n/M) times a speed of a normal read-out mode of the two or more read-out modes in a predetermined period of (M/n) frame, and wherein at least one of the read-out modes simultaneously reads the pixel signals from two or more pixels in each group and adds the pixel signals on the floating diffusion portion.

28. The camera system of claim 27, wherein the driving unit performs read-out at a speed that is n times a speed of a normal read-out mode of the two or more read-out modes in a predetermined period of (1/n) frame.

29. The camera system of claim 27, further including a pixel signal reading unit that includes a number of analog to digital (AD) conversion processes and performs read-out at a speed that is n times a speed of a normal read-out mode of the two or more read-out modes, and the number of AD conversion processes performed in one processing period is smaller in the other of the two or more read-out modes than in the normal read-out mode.

30. The camera system of claim 27, the system further including a pixel signal reading unit that includes a number of analog to digital (AD) conversion processes wherein the number of the AD conversion processes performed in one processing period in the normal read-out mode is the same as that in the other of the two or more read-out modes.

31. The camera system of claim 27, wherein a plurality of photosensitivity conditions and/or exposure time conditions are set for the plurality of pixels, and the photosensitivity conditions or the exposure time conditions of pixels that are disposed so as to face each other in a diagonal direction are set to be the same.

32. The camera system of claim 27, wherein each of the pixels includes a photoelectric conversion portion to generate a charge according to an incident light.

33. The camera system of claim 32, wherein each of the pixels includes a transistor portion to transfer the charge from the photoelectric conversion portion to the floating diffusion portion.

34. The camera system of claim 27, wherein each of the groups includes two or more pixels that share a transistor portion to reset charge stored in the floating diffusion portion.

35. The camera system of claim 27, wherein each of the groups includes two or more pixels that share a transistor portion to convert charge stored in the floating diffusion portion to the pixel signal.

36. The camera system of claim 27, wherein each of the groups includes four pixels, and wherein for any one group each of the four pixels is sensitive to the same color.

37. The camera system of claim 27, wherein each of the groups includes four pixels that have two small groups, wherein each of the small groups include two pixels that are disposed so as to face each other in a diagonal direction.

38. The camera system of claim 27, wherein one of the two small groups has a different exposure period or a different photosensitivity condition from another of the two small groups.

39. The camera system of claim 27, wherein each of the groups includes four pixels that have a different exposure period or a different photosensitivity condition respectively.

* * * * *